United States Patent [19]

Blankenbecler

[11] Patent Number: 5,703,722
[45] Date of Patent: Dec. 30, 1997

[54] SEGMENTED AXIAL GRADINET ARRAY LENS

[76] Inventor: Richard Blankenbecler, 974 Cottrell Way, Stanford, Calif. 94305

[21] Appl. No.: 681,225

[22] Filed: Jul. 22, 1996

Related U.S. Application Data

[63] Continuation-in-part of Ser. No. 395,387, Feb. 27, 1995, Pat. No. 5,541,774.

[51] Int. Cl.$^6$ ............... G02B 3/00; G02B 13/08; G02B 3/08; G02B 9/00
[52] U.S. Cl. ............... 359/653; 359/668; 359/671; 359/741; 359/742; 359/797
[58] Field of Search ............... 359/652, 653, 359/654, 709, 668, 669, 671, 741, 742, 797

[56] References Cited

U.S. PATENT DOCUMENTS

| | | | |
|---|---|---|---|
| 1,943,521 | 1/1934 | Ewald | 88/57 |
| 2,596,799 | 5/1952 | Tillyer et al. | 88/57 |
| 3,393,034 | 7/1968 | Imai | 359/742 |
| 3,712,713 | 1/1973 | Appledorn | 359/741 |
| 4,501,468 | 2/1985 | Borrelli et al. | 350/96.25 |
| 4,758,071 | 7/1988 | McLaughlin et al. | 350/413 |
| 4,805,997 | 2/1989 | Asahara et al. | 350/413 |
| 4,810,070 | 3/1989 | Suda et al. | 350/413 |
| 4,900,138 | 2/1990 | Atkinson, III et al. | 350/413 |
| 4,907,864 | 3/1990 | Haterty et al. | 350/413 |
| 4,929,065 | 5/1990 | Hagerty et al. | 350/413 |
| 4,934,798 | 6/1990 | Bunch | 359/652 |
| 4,952,037 | 8/1990 | Oikawa et al. | 350/413 |
| 5,044,737 | 9/1991 | Blankenbecler | 359/653 |
| 5,236,486 | 8/1993 | Blankenbecler et al. | 65/61 |
| 5,262,896 | 11/1993 | Blankenbecler | 359/653 |
| 5,323,268 | 6/1994 | Kikuchi | 359/664 |

OTHER PUBLICATIONS

J.M. Stagman and D.T. Moore, "Laser diode to fiber coupling using anamorphic gradient–index lenses", Applied Optics, vol. 23, No. 11, Jun. 1, 1984, pp. 1730–1734.

C. Wang and D.L. Shealy, "Design of gradient–index lens systems for laser beam reshaping", Applied Optics, vol. 32, No. 25, Sep. 1, 1993, pp. 4763–4769.

Leo Levi, *Applied Optics: A Guide to Optical System Design/Volume 1*, 1968, pp. 488–493.

A.C.S. Van Heel, "One radius doublets", Opt. Acta, vol. 2, No. 1, Apr. 1955, pp.29–35.

R. Blankenbecler et al., "Gradient index glass of macro dimensions and large $\Delta n$", Journal of Non–Crystalline Solids, 129(1991) pp. 109–116.

*Primary Examiner*—David C. Nelms
*Assistant Examiner*—Evelyn A. Lester
*Attorney, Agent, or Firm*—Steven M. Mitchell

[57] ABSTRACT

A segmented axial gradient array lens is provided. In one embodiment, the segmented array lens includes two sheets of optical material which mate at opposing faces which have a series of corresponding parallel grooves and ridges. At least one of the sheets has an axial gradient index of refraction profile. This provides the functionality of a series of parallel cylindrical lenses. The array lenses may include one or more additional intermediate sheets which may have a homogeneous or axial gradient index. With the first and last sheets having an axial gradient index of refraction, and the grooves forming the first and last interfaces between the sheets being rotated 90 degrees relative to each other, a two dimensional array of point foci can be provided. An array of cones and conical indentations can be used at the interfaces to provide the functionality of an array of spherical lenses. An array lens of the invention can be used to provide an optical multiplexer.

21 Claims, 15 Drawing Sheets

FIGURE 1 -- PRIOR ART

SEGMENTED AXIAL GRADINET ARRAY LENS

This application is a continuation-in-part of application Ser. No. 08/395,387 filed Feb. 27, 1995, now U.S. Pat. No. 5,541,774.

BACKGROUND OF THE INVENTION

1. Field of the Invention

The present invention relates generally to lenses, and more particularly to array lenses formed from a plurality of sheets of optical material, some of which have axial refractive index gradients.

2. Prior Art

A conventional lens with spherical surfaces and with a homogeneous index of refraction will not focus light perfectly; there will be spherical and chromatic aberrations. The latter aberrations may be canceled, for example, by using a lens doublet in which each lens has a unique chemical composition and therefore an index of refraction with its own dependence on the wavelength of light. The chromatic aberrations can be reduced by cancellation between the two indices. The spherical aberrations can be eliminated by the expensive and difficult process of grinding a predetermined aspherical surface on the lens. It is also well known in the art that these aberrations can be eliminated by employing axial gradient lens blanks. An axial gradient lens is a lens which has an index of refraction profile which varies in one direction only, usually chosen to be the optical axis. These aberration-free lenses can be used advantageously in a variety of optical systems, such as slide projectors, cameras, binoculars, and many other imaging devices; the number of lens elements required for a given task can be reduced as well as the weight and complexity of the system.

The blanks for the fabrication of such gradient lenses can be made by a variety of processes such as SOL-GEL, infusion, and diffusion and may be glass, plastic or other suitable optical material. In particular, there is the controlled diffusion process that can produce macro lenses with a prescribable index of refraction axial profile. The fabrication of such axial gradient lenses by the controlled diffusion process is disclosed in U.S. Pat. No. 5,262,896, "Refractive Elements With Graded Properties and Methods for Making Same", to R. Blankenbecler, which patent is incorporated herein by reference. These lenses are available from Light-Path Technologies of Tucson, Ariz.

The above discussion applies to both radial and cylindrical lenses; however the grinding and polishing of cylindrical lenses to the needed precision is especially difficult. Cylindrical lenses condense or expand a beam of light in one transverse dimension only; they can focus light into a thin line and are used in laser scanners, fax machines, laser printers, and in the Cinemascope process, for example. Cylindrical lenses also can be used to produce a symmetrical output beam from an unsymmetrical source such as a laser diode.

A lens design for coupling a laser diode to a multimedia fiber using anamorphic radial gradient-index components is described by J. M. Stagaman and D. T. Moore, "Laser diode to fiber coupling using anamorphic gradient-index lenses", *Applied Optics*, vol. 23, no. 11, pp. 1730–1734 (1984). These authors discuss the disadvantages and difficulties in the conventional approach of utilizing prisms and/or cylindrical lenses. Their optimum design for a lens system to be used with a laser diode source with astigmatism uses a gradient index lens with an elliptical profile. However, there is no known method to fabricate a general anamorphic lens in which each transverse dimension has its own independent index profile.

A monolithic anamorphic lens having at least one curved surface and an axial gradient index parallel to an optical axis is disclosed in U.S. Pat. No. 4,900,138 to Atkinson, III, et al., issued Feb. 13, 1990. This patent also describes other gradient index profiles and is incorporated herein by reference.

A cemented lens design in which two (or more) different types of homogeneous glass are ground into the proper shape then polished and cemented together, is well known in the art. In *Applied Optics*, by Leo Levi, Vol. 1, John Wiley & Sons, New York, (1968), it is stated that with a proper choice of glasses and shapes, it is possible to reduce both chromatic and spherical aberrations in a cemented lens despite the severe restrictions on available choices. A variation of this type of lens has also been described by A. C. S. van Heel in "One-Radius Doublets", *Optica Acta*, Vol. 2, pp. 29–35 (1955).

Also known to the art is a segmented lens design in which two different types of homogeneous glass with different values of the index of refraction are bonded together by heat and the interface molded (slumped) into a prescribed shape. The external faces are then ground flat. This is a monolithic lens with a discontinuous index of refraction across a smooth aspherical interface. This lens has low optical power and has been proposed as a corrector plate. Such a lens is disclosed in U.S. Pat. No. 2,596,799, "Aberration Corrector Member for Image Forming Optical Objectives", to Tillyer, et. al., issued May 13, 1952.

Another type of segmented lens known to the art is built up of constituents of different indices of refraction as described by W. Ewald, in "Lens for Optical Purposes" U.S. Pat. No. 1,943,521, issued Jan. 16, 1934. The separate parts of the lenses, each of which is homogeneous, are cemented together in such a manner that the boundary surfaces or interfaces are substantially located in the direction of the path of light rays. That is, the interfaces are parallel to the optical axis. The indices of refraction are chosen so as to reduce the spherical aberration of the lenses and produce clearly defined images on a screen.

A patent teaching the fabrication and design of a double axial gradient lens blank has been granted to the present inventor, R. Blankenbecler, "Double Axial Gradient Lens and Process for Fabrication Thereof", U.S. Pat. No. 5,044,737, issued Sep. 3, 1991, which patent is incorporated herein by reference. A diffusion process produces a monolithic lens with a continuous index of refraction profile; the lens is composed of three regions, front, center, and rear, each of which can have its own graded index of refraction profile and chemical composition.

A patent teaching the forming of a cylindrical or spherical gradient lens blank from an axial gradient lens blank by heat molding (slumping) has been granted to R. Blankenbecler and M. Wickson, "Shaped Gradient Fabrication In Lenses By Molding From Axial Gradient", U.S. Pat. No. 5,236,486, issued Aug. 17, 1993, which patent is incorporated herein by reference. This process produces a monolithic lens with a continuous index of refraction profile.

A design for a cemented gradient index lens system for laser beam reshaping is disclosed by C. Wang and D. L. Shealy, "Design of gradient-index lens systems for laser beam reshaping", *Applied Optics*, vol. 32, pp. 4763–4769 (1993). A system using two axial gradient lenses and a homogeneous central transfer lens is disclosed. The front and rear faces are flat planes. The interfaces between the front gradient lens and the central transfer lens and the central transfer lens and the rear gradient lens are spherical surfaces that must be ground and polished to fit into each other. In addition, the gradient index profiles are different and must be chosen properly to function as a beam reshaper.

As mentioned above, spherical and chromatic aberrations will be present in lenses with spherical or cylindrical external surfaces. A suitable index of refraction profile (essentially linear) in the spherical or cylindrical lens cap can be used to cancel the spherical aberration and form a precise image. However this normally requires a large change in index across the profile. Furthermore, the surface of the cap must be ground and polished in a region of varying index, varying hardness, and varying coefficient of thermal expansion which is a difficult process to carry out with accuracy. An aspherical shaped surface on a homogeneous lens will also reduce this particular aberration, but the fabrication of such a lens surface with the required accuracy is a very difficult process. Even the grinding and polishing of a simple cylindrical surface on a lens blank is difficult and expensive in comparison to a spherical surface.

There are many applications in optics for a lens array that breaks up an incident beam into many smaller beams and focuses each of these onto a separate focal point. One example of such a system would involve a detector composed of many separate pixel elements at the foci. The fabrication of a lens array composed of many small lenses that must be accurately assembled and aligned is both difficult and expensive. It would be desirable to provide an optical array that is simple, rugged, and easy to assemble which would focus a light beam onto an array of focal points.

A multiplexer is a device which takes a single input signal and splits it into a plurality of identical output signals. Multiplexers are common components in electronic and microwave devices but acceptable multiplexers are not available for optical systems. It would be desirable to have a simple, rugged, and easy to assemble multiplexer for use with optical devices and processing systems.

It is therefore an object of the invention to provide an improved type of lens having the function of an array of cylindrical or spherical lenses but which does not require individual lens elements or cylindrical or spherical surfaces anywhere in the lens.

It is another object of the invention to provide a lens for use as an optical multiplexer.

It is still another object of the invention to provide an array lens system which provides independent manipulation of a beam of light in two transverse orthogonal directions to provide a two dimensional output array of foci.

SUMMARY OF THE INVENTION

The segmented axial gradient array lens of the invention provides a flexible framework for the lens designer to achieve many desirable optical functions. In particular, an array lens having the functionality of an arrangement of difficult to fabricate cylindrical or spherical lenses is provided.

In a preferred embodiment of the invention, a segmented array lens having a front surface, a rear surface and a plurality of parallel optical axes is provided. The lens includes first and second planar sheets of optical material such as glass or plastic. The first planar sheet includes first and second sides and has an axial gradient index of refraction profile. The second side of said first sheet has a series of parallel grooves which are each perpendicular to one of the optical axes, each of the grooves including a pair of planar walls with adjacent ones of the grooves intersecting at one or more ridges parallel to the grooves. The second planar sheet has first and second sides with the first side of the second sheet including a series of corresponding parallel grooves with each of the grooves including a pair of corresponding planar walls. Adjacent ones of the grooves intersect at one or more ridges parallel to the grooves. The ridges of the second side of the first sheet mate with the grooves of the first side of the second sheet and the ridges of the first side of the second sheet mate with the grooves of the second side of the first sheet to form a continuous interface with no air gaps from the first sheet to the second sheet. At least one wall of the grooves forms a finite, non-normal angle with an optical axis. If one of the sheets has a suitably chosen axial index of refraction profile, this configuration provides an array lens which takes an input of a light beam and produces an output of a series of line foci. This has the functionality of an array of parallel cylindrical lenses.

In an alternative equally preferred embodiment of the invention, a segmented array lens including a plurality of planar sheets is provided. The lens has a front surface, a rear surface and a plurality of parallel optical axes and each sheet has a first and a second side. The first side of a first sheet forms the front surface of the lens and the second side of the first sheet has a series of parallel grooves, each of the grooves including a pair of planar walls, adjacent ones of the grooves intersecting at one or more ridges parallel to the grooves. The second side of a last sheet forms the rear surface and the first side of the last sheet includes a series of parallel grooves, each of the grooves including a pair of planar walls, adjacent ones of the grooves intersecting at one or more ridges parallel to the grooves. The lens further includes one or more intermediate sheets positioned between the first and second sheets. The first and second sides of each of the intermediate sheets each has a series of parallel grooves. The ridges and grooves of adjacent ones of the sheets mate to form continuous interfaces between adjacent sheets. At least one wall of the grooves forms a finite, non-normal angle with an optical axis. In one example of this embodiment there are three sheets with the first and last sheets having an axial gradient index of refraction and the single intermediate sheet having a homogeneous index of refraction. If the grooves between the first and intermediate sheets are rotated 90 degrees about a central axis relative to the grooves forming the interface between the intermediate and last sheets, the output of the array lens is a two dimensional array of point loci at the image plane of the lens. If these grooves are instead parallel, the output is a series of parallel beam strips. Additional intermediate sheets can be utilized to provide desired magnification and focal length properties.

In another alternative embodiment of the invention, rather than grooves at the interfaces between sheets, arrays of cones and conical indentations are utilized. Each cone functions as a spherical lens and the output of the array lens is a two dimensional array of point foci.

The array lenses of the invention may be used to provide optical multiplexers. This will take a relatively narrow input beam, such as would be provided by an optic fiber and splits it into two or more parallel output beams. This is preferably provided using two sheets of optical material with the first sheet having an axial gradient index of refraction and the second sheet having a homogeneous index of refraction. The number of output beams is governed by the number of ridges at the interface between the two sheets. To achieve this functionality, the input beam must diverge within the first sheet by either using the natural divergence of the beam or by providing a diverging stage at the input of the first sheet. Such an optical multiplexer will find use in optical processing and in connections in optical fiber networks.

In each of the embodiments, the sheets are clamped, cemented, heat bonded, or otherwise joined using conventional technology to form a monolithic lens assembly.

The segmented axial gradient array lens offers increased flexibility to the optical designer. Since the optical power of the lens is provided by the difference in index between the adjoining segments, the lens can exhibit smaller chromatic aberrations than a conventional lens. The chemical composition of each sheet can be chosen to ameliorate the chromatic aberrations.

BRIEF DESCRIPTION OF THE DRAWINGS

The various features and advantages of the present invention may be more readily understood with reference to the following detailed description taken in conjunction with the accompanying drawings in which.

DETAILED DESCRIPTION OF THE INVENTION

The basic principles of segmented axial gradient lenses will first be discussed with reference to FIGS. 1–9 and then the segmented axial gradient array lenses of the invention will be described with reference to FIGS. 10–18. As used herein, a segmented lens is a lens composed of two or more close-fitting segments or sections. An array lens expands this structure using sheets of optical material and providing a two dimensional array output. The contact surface between two segments or sheets is an interface. In addition, there is a front external surface and a rear external surface of the complete lens assembly. At least one of the segments or sheets contains an axial gradient in its index of refraction with the remaining segment or sheet having a homogeneous index of refraction or an axial gradient index. The chemical composition of each segment or sheet may be chosen independently subject only to being consistent with the desired optical performance. The final lens assembly has the segments or sheets clamped, cemented, heat bonded or otherwise joined to form a monolithic unit. One novel feature of the invention is that the interfaces between the sheets comprise either grooves or cones. At least one wall of the grooves is set at a finite, non-normal angle to the optical axis. For purposes of this application, this is intended to mean that a general ray drawn parallel to the optical axes will intersect the interface (excepting the ridges) at a non-normal angle. In addition, that wall is non-normal to the optical axis. These simple surfaces are easily fabricated using standard techniques well known in the art. No spherical or aspherical interface surfaces are required.

Another novel feature of the invention is that the optical power and the optical function of the lens is provided by prescribing the index of refraction profile in the various segments. The difference in index between the adjoining sheets produces a desired bend in an incident light ray path if it strikes the interface at a non-normal angle. Thus the interfaces are set at a finite angle to the optical axis. The resultant path of the light ray can be calculated from known laws of optics.

Figure 1:
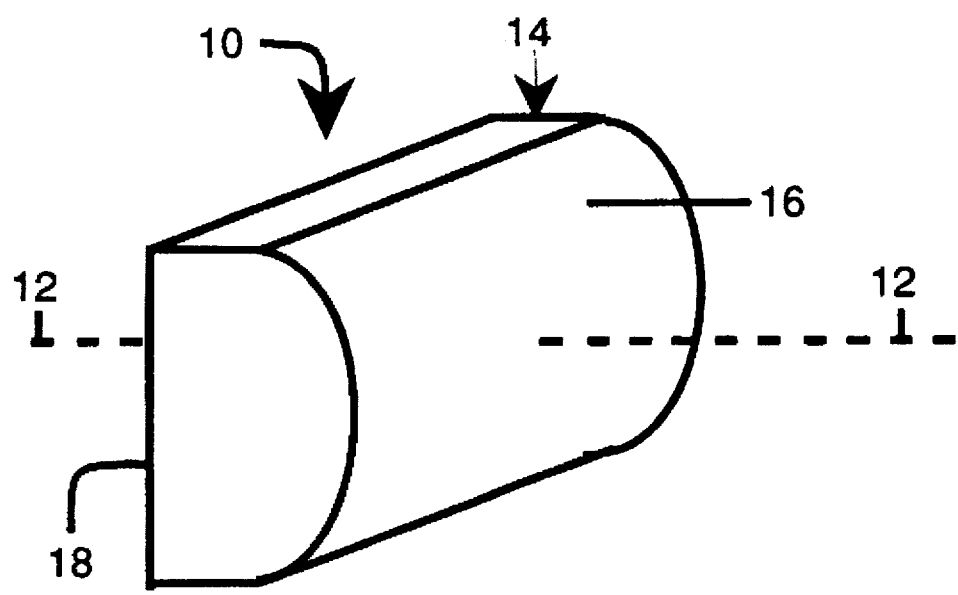
FIG. 1 is a plano-convex cylindrical lens of the prior art.

A standard homogeneous cylindrical lens 10 of plano-convex type with an optical axis 12 is depicted in FIG. 1 as a single representative of the prior art. A segment 14 has a constant index of refraction throughout. A rear surface 16 is cylindrical and a front face 18 is a plane with the rear surface 16 functioning to focus light in a single transverse direction.

Figure 2:
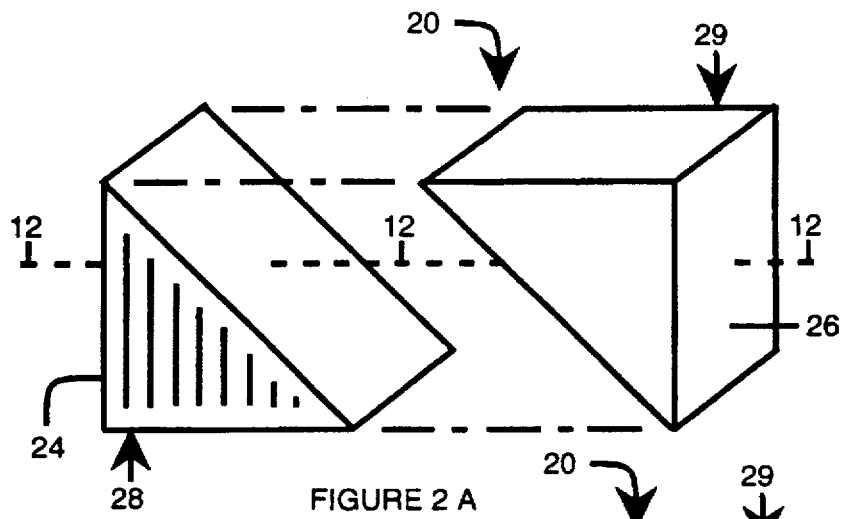
FIG. 2A is an exploded view of a two segment axial gradient lens with a planer interface between an axial gradient segment and a homogeneous segment.
FIG. 2B is an assembled view of the lens of FIG. 2A.
FIG. 2C is a two segment axial gradient lens with a planer interface between an axial gradient segment and a homogeneous section having a back cylindrical surface.
FIG. 2D is a two segment axial gradient lens with a planer interface between two axial gradient segments.
Figure 2:
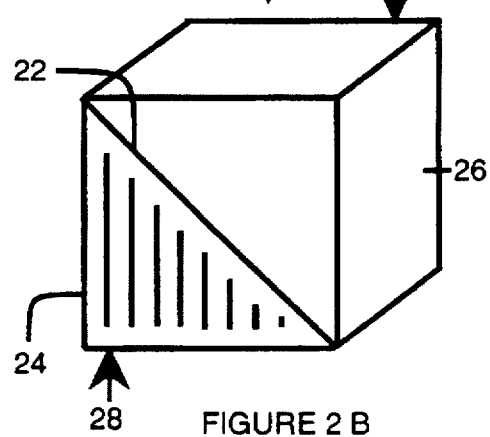
Figure 2:
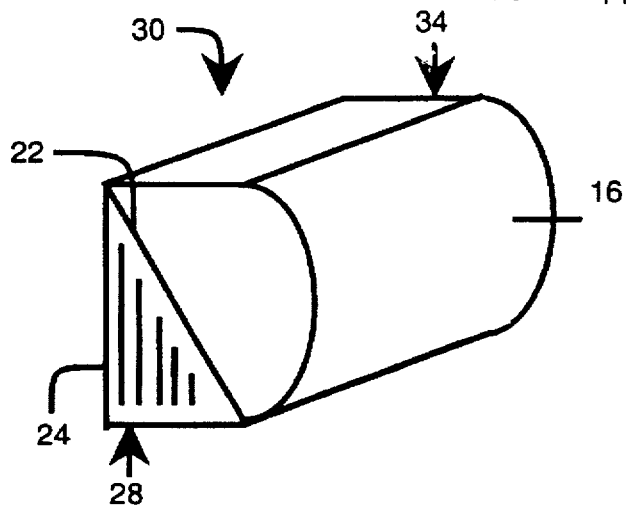
Figure 2:
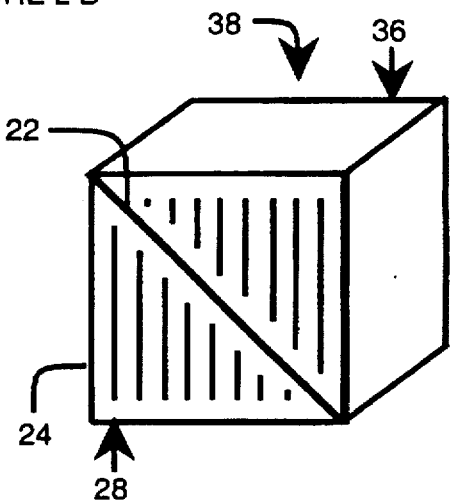
Figure 3:
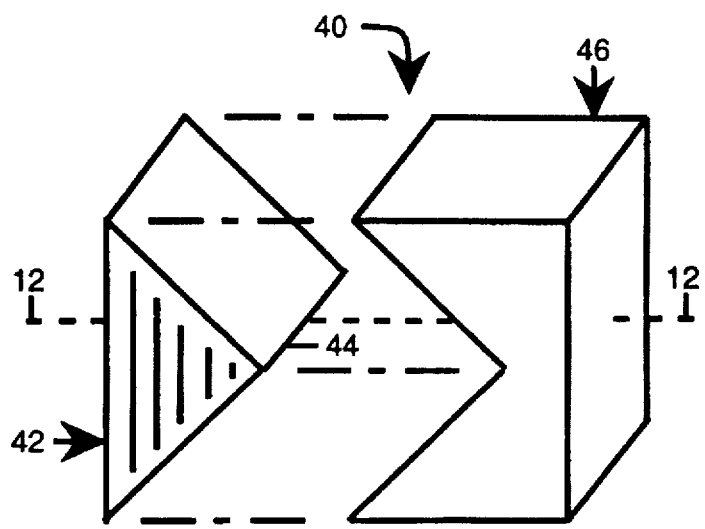
FIG. 3A is an exploded view of a two segment axial gradient lens with a wedge interface between an axial gradient segment and a homogeneous segment.
FIG. 3B is an assembled view of the lens of FIG. 3A.
FIG. 3C is a two segment axial gradient lens with a wedge interface between an axial gradient segment and a homogeneous section having a back cylindrical surface.
FIG. 3D is a two segment axial gradient lens with a wedge interface between two axial gradient segments.
Figure 3:
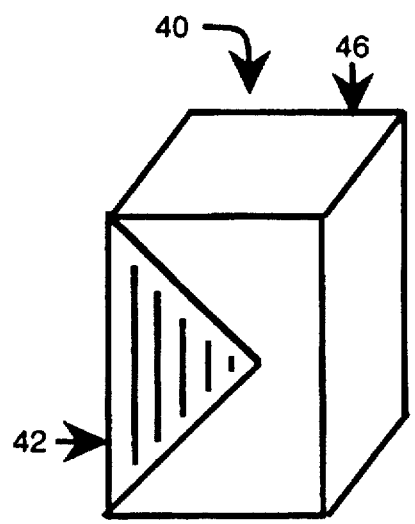
Figure 3:
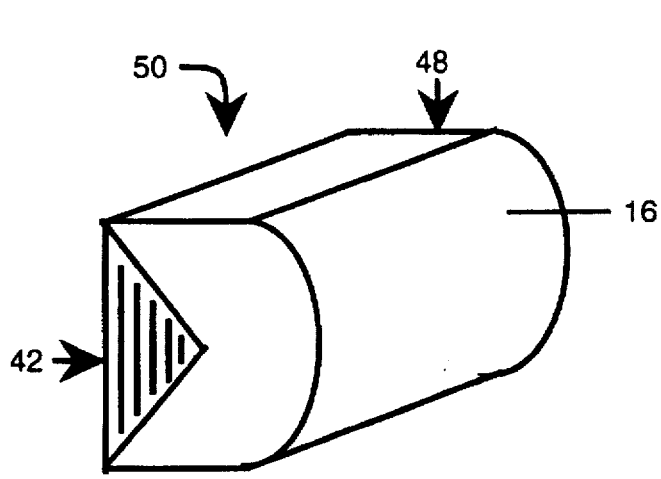
Figure 3:
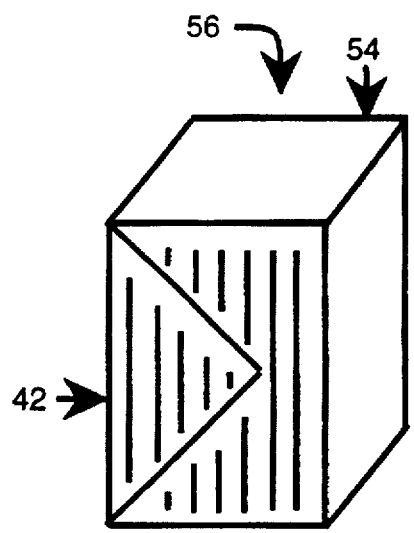
Figure 4:
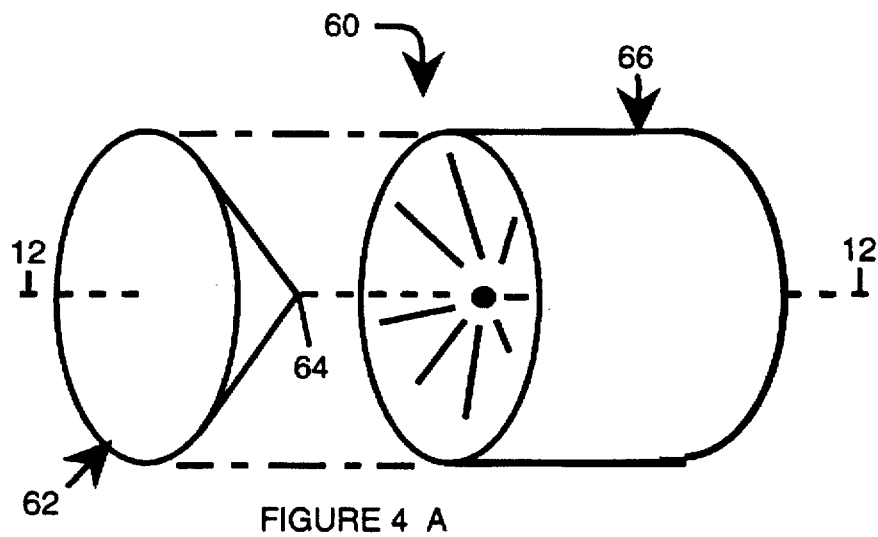
FIG. 4A is an exploded view of a two segment axial gradient lens with a cone interface between an axial gradient segment and a homogeneous segment.
FIG. 4B is a cross-sectional assembled view of the lens of FIG. 4A.
FIG. 4C is a two segment axial gradient lens with a cone interface between an axial gradient segment and a homogeneous section having a back spherical surface.
FIG. 4D is a cross-sectional view of a two segment axial gradient lens with a cone interface between two axial gradient segments.
Figure 4:
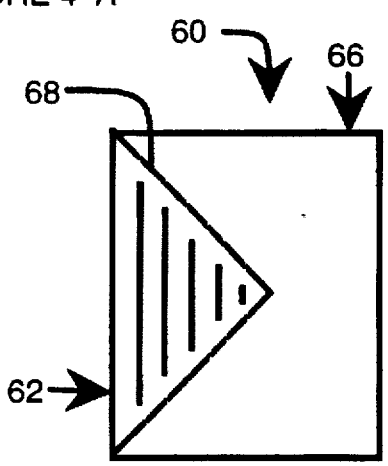
Figure 4:
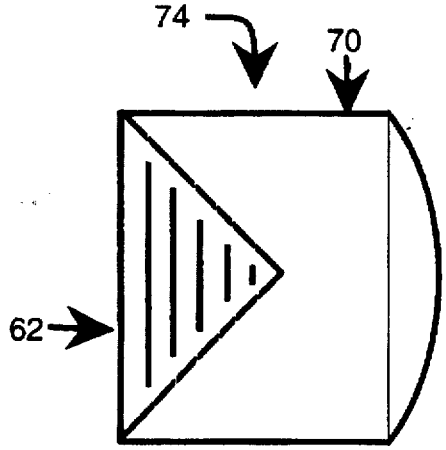
Figure 4:
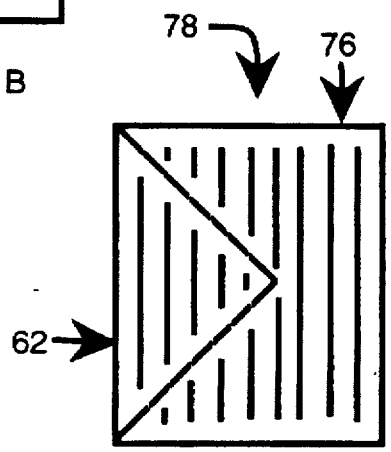
Figure 5:
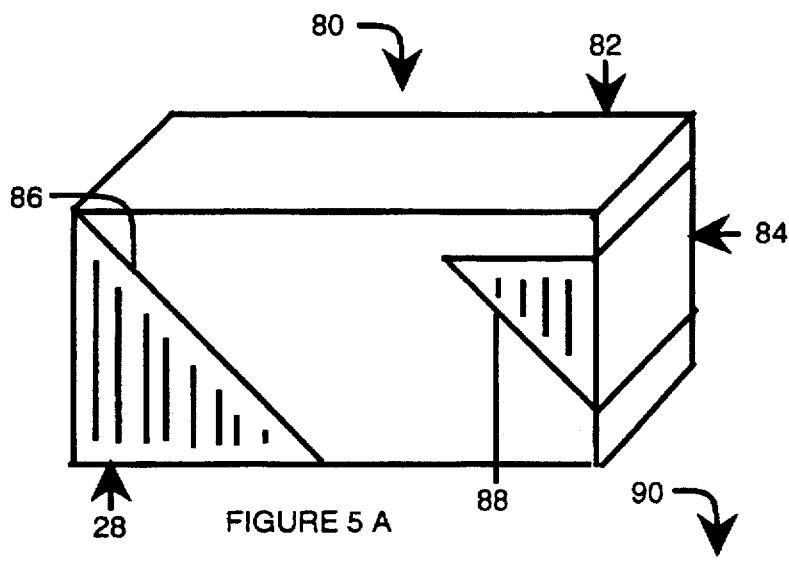
FIG. 5A is an assembled three segment axial gradient lens having two plane interfaces with a homogeneous segment between two axial gradient segments.
FIG. 5B is a three segment axial gradient lens having two wedge interfaces with a homogeneous segment between two axial gradient segments.
FIG. 5C is a three segment axial gradient lens having two wedge interfaces with a tapered central homogeneous segment between two axial gradient segments.
Figure 5:
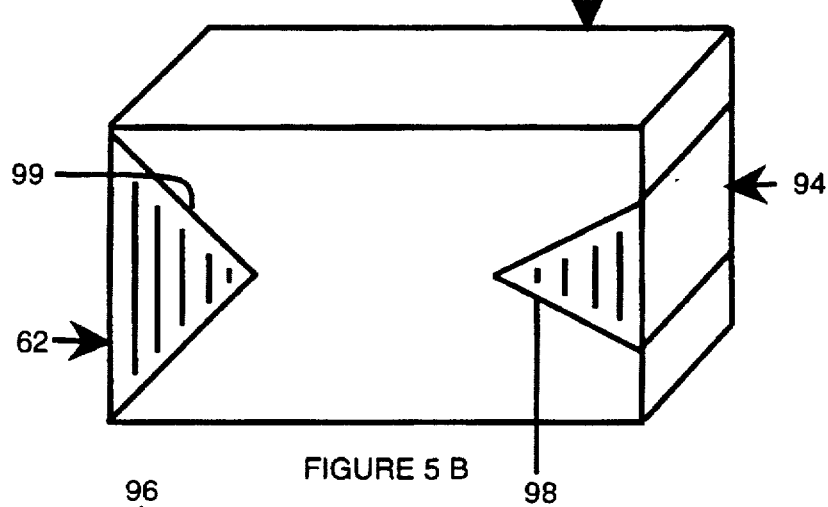
Figure 5:
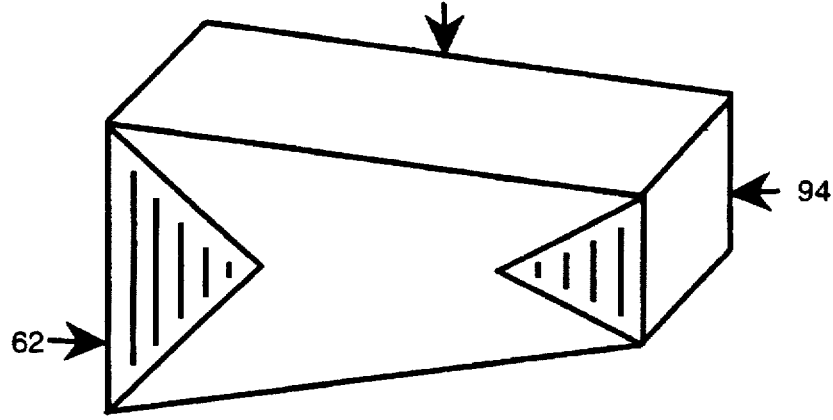

In FIGS. 2A and 2B, the simplest embodiment of a segmented axial gradient lens is illustrated. A two segment cylindrical lens 20 is shown with an optical axis 12 in an exploded view in FIG. 2A and an assembled view in FIG. 2B. This design has a plane interface 22, a plane front surface 24 and a plane rear surface 26. A first segment 28 has an appropriately chosen axial variation in its index of refraction while a second segment 29 is homogeneous. In all the figures, the lines on the sides of the segments mark the planes of constant index of refraction which are normal to the optical axis 12. For a fixed total variation in the index of refraction along the interface, i.e., as measured down the slope of the interface 22, the focal length increases as the interface plane moves toward perpendicular to the optical axis 12. The image which exits the lens 20 can be moved perpendicular to the optical axis 12 (vertically in FIG. 2) by changing the value of the index of refraction of the homogeneous region.

The use of a segmented axial gradient lens 30 with the cylindrical external surface 16 is illustrated in FIG. 2C. When the index of refraction profile of segment 28 is chosen appropriately, the lens functions as a compound lens and, in addition, the aberrations arising from the constant curvature of the surface 16 of the homogeneous segment 34 can be canceled. The focal length given by the curved surface 16 can be preserved and the aberrations still canceled by choosing an axial index profile in the front segment 28 which varies slowly, essentially as the cube of the distance from the point where the optical axis 12 crosses the interface 22. Thus the curved surface 16 is fabricated in the homogeneous segment 34, a well known art, while the axial gradient segment 28 only has one flat front face 24 and one flat interface 22.

Homogeneous segment 29 in FIGS. 2A and 2B can be replaced by a segment 36 with an axial gradient region as depicted in FIG. 2D to provide a lens 38. If the index profile in segment 36 varies opposite to the index profile of segment 28, the lens 38 having a cylindrical functionality will have a shorter focal length (for the same total change in index of refraction in each segment) for appropriately chosen profiles. It is the difference in the value of the index of refraction in the two profiles at the point of intersection of a light ray with the interface 22 that determines the ray paths. Thus there is more freedom in choosing the individual profiles in the embodiment of FIG. 2D in that a designer has a larger set of parameters to vary in order to optimize selected optical and physical properties of the lens 38.

The plane interface 22 of FIGS. 2A–2D can be replaced by a wedge or cuneate interface as shown in FIGS. 3A–3D. An exploded view of a lens 40 is shown in FIG. 3A, and an assembled view is shown in FIG. 3B. A first wedge segment 42 with a linear apex or ridge 44 has an appropriate variation in its index of refraction while a second segment 46 is homogeneous. The index of refraction of homogeneous segment 46 is preferably, but not necessarily, chosen to be equal to the value of the index of refraction at ridge 44 of segment 42. It is obvious that the lens 40 will also function if segment 42 is homogeneous and segment 46 has a suitably chosen axial gradient. The use of an axial gradient wedge segment 42 and a homogeneous segment 48 with a cylindrical external surface 16 is illustrated with a lens 50 in FIG. 3C. If the index of refraction profile of segment 42 is chosen appropriately, the lens 52 will function as a compound lens and the aberrations arising from the surface curvature of segment 50 can be canceled. The focal length given by the curved surface can be preserved and the aberrations canceled by choosing an axial index profile in the wedge segment 42 which varies slowly, essentially as the cube of the distance from the point where the optical axis 12 crosses the wedge interface 44. In this embodiment, the curved surface 16 fabricated in the homogeneous segment, a well known art, while the axial gradient segment 42 only has a flat front surface and flat interfaces. As in the case of the plane interface, homogeneous segment 46 can be replaced by a segment 54 with a suitably chosen index gradient to yield a more flexible cylindrical lens functionality as is shown in FIG. 3D.

The linear wedge in the above embodiments can be replaced by a cone geometry as shown in FIGS. 4A–4D. An exploded view of lens 60 is shown in FIG. 4A and an assembled cross-sectional view is shown in FIG. 4B. A cone segment 62 with an axial gradient profile and a pointed tip 64 is inserted into an appropriately shaped homogeneous segment 66. The resultant lens 60 has a radial symmetry. The index of refraction of homogeneous segment 66 is preferably chosen to be equal to the value of the index at tip 64 of segment 62. When the index of refraction profile of segment 62 is chosen appropriately, the lens will produce a point focus instead of the line focus characteristic of a cylindrical lens. The use of an axial gradient cone segment 62 and a homogeneous segment 70 with a spherical external surface is illustrated with a lens 74 in FIG. 4C. If the index of refraction profile of segment 62 is chosen appropriately, the lens 74 will function as a compound lens and the aberrations arising from the surface curvature of segment 70 can be canceled. The focal length given by the curved surface can be preserved and the aberrations canceled by choosing an axial index profile in the wedge segment 62 which varies slowly, essentially as the cube of the distance from the point where the optical axis 12 crosses the cone interface point 64. In this embodiment, the curved surface is fabricated in the homogeneous segment, a well known art, while the axial gradient segment 62 only has a flat front surface and cone shaped interface. As illustrated in FIG. 4D, the homogeneous segment can be replaced by a segment 76 with a gradient index profile that varies opposite to that of segment 62 to yield a more flexible design for a lens 78.

Other desirable optical functions can be achieved by a three segment lens. A lens having three segments, each with its own independent index of refraction profile, will give the lens designer the maximum flexibility. However, for simplicity, several examples in which one of the segments, the central or middle one, is homogeneous in the index of refraction will be described.

FIGS. 5A–5C show several three segment lens designs with two internal interfaces. In FIG. 5A, a lens 80 is depicted which is formed from an axial gradient segment 28 followed by a homogeneous segment 82 which in turn is followed by a second gradient segment 84 to form lens 80. This design has a front plane interface 86 and a rear plane interface 88. These segments have only plane optical surfaces and are cut to fit into each other. In FIG. 5B, a lens 90 with two optical wedge interfaces is depicted. An axial gradient wedge segment 62 is followed by a homogeneous segment 92 which in turn is followed by a second gradient wedge segment 94. These segments have only plane wedge interfaces and are cut to fit into each other. Homogeneous segment 92 can be replaced by a tapered segment 96 as shown in FIG. 5C. Both of these designs have a wedge shaped interface 98 in the rear and a wedge shaped interface 99 in the front as depicted in FIG. 5B.

If the wedges are aligned parallel to each other as in FIG. 5B and FIG. 5C, the index of refraction profiles in the first and third segments can be chosen so that the assembly operates as a cylindrical convex-convex, convex-concave, concave-convex or concave-concave lens. By appropriate choice of the index profiles, the resultant lens can be fabricated as either a positive (convergent) or a negative (divergent) cylindrical lens.

A cylindrical beam expander/contractor can be achieved by using the three-segment design types shown in FIGS. 5A–5C. The index of refraction profiles in segment 28 and segment 84 in FIG. 5A, and the index profiles in segment 62 and segment 94 in FIGS. 5B and 5C, can be chosen to scale the beam in one transverse direction while keeping the incident and exit rays parallel. The scaling of the beam can be either a contraction or an expansion in one dimension.

A cylindrical beam reshaper can also be achieved by the same design layout as illustrated in FIGS. 5A–5C. The index profiles in segment 28 and segment 84 in FIG. 5A, and the index profiles in segment 62 and segment 94 in FIGS. 5B and 5C, are chosen both to scale the beam and to redistribute the beam intensity as the designer requires. For example, in certain applications it is desirable to reshape the beam from a laser from an (essentially) gaussian transverse intensity distribution into a substantially flat distribution. This can be accomplished by choice of the index of refraction profiles of the front and rear axial gradient segments.

Figure 6:
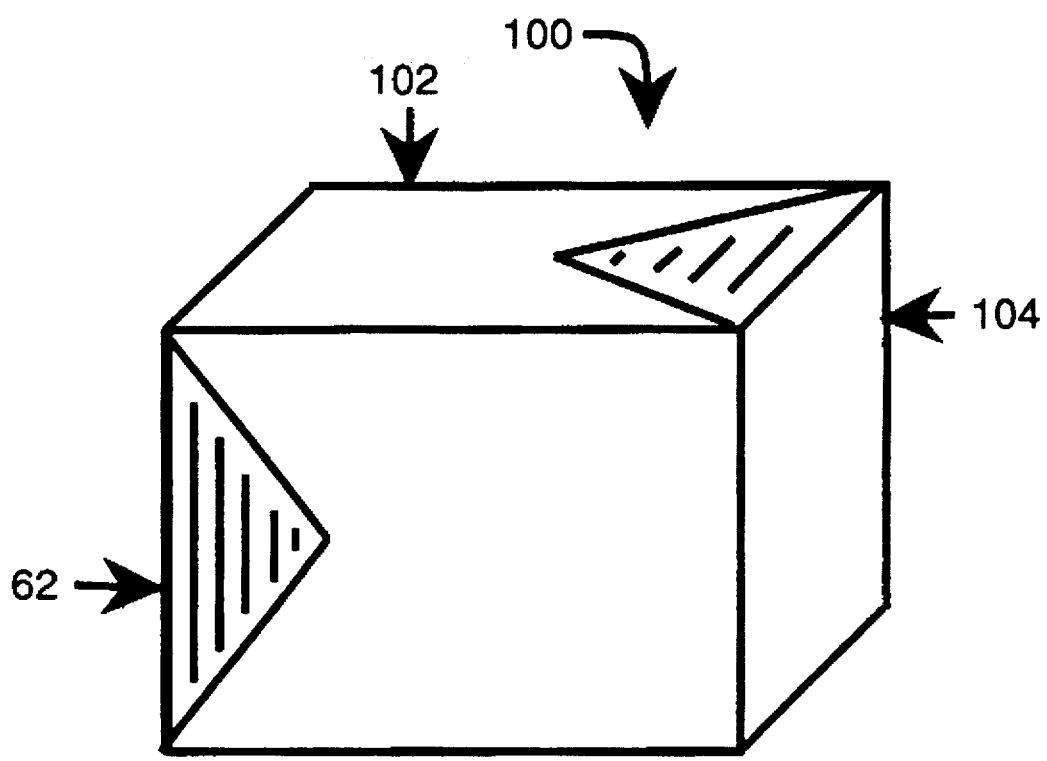
FIG. 6 is a three segment axial gradient lens having two axial gradient wedges with the wedge angles at right angles to each other via a homogeneous central segment.

Alternatively, the wedges can be aligned perpendicular to each other, as shown with a lens 100 in FIG. 6. An axial gradient wedge segment 62 is followed by a homogeneous segment 102 which is followed by a second gradient wedge segment 104 which is rotated 90 degrees from the orientation of wedge segment 62. The index of refraction profile in segment 62 and in segment 104 can be chosen so that the assembly 100 operates functionally as two cylindrical lenses at right angles to each other. By appropriate choice of these two index profiles, the resultant lens can function as a general as anamorphic lens in which the optical parameters of the two transverse directions can be chosen independently.

Figure 7:
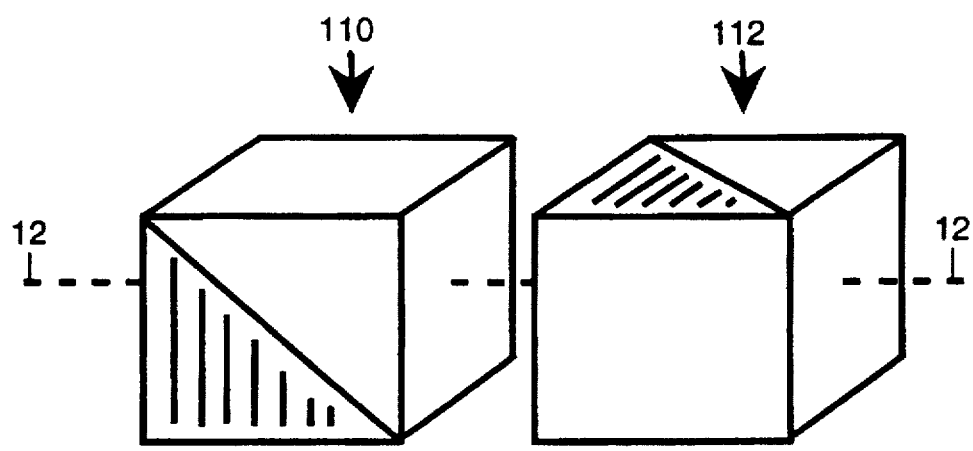
FIG. 7A is an axial gradient lens which is composed of two of the lenses of FIG. 2B mounted at right angles to each other.
FIG. 7B is an axial gradient lens which is composed of two of the lenses of FIG. 3B mounted at right angles to each other.
FIG. 7C is an axial gradient lens which is composed of two of the three segment lenses of FIG. 5B mounted at right angles to each other.
Figure 7:
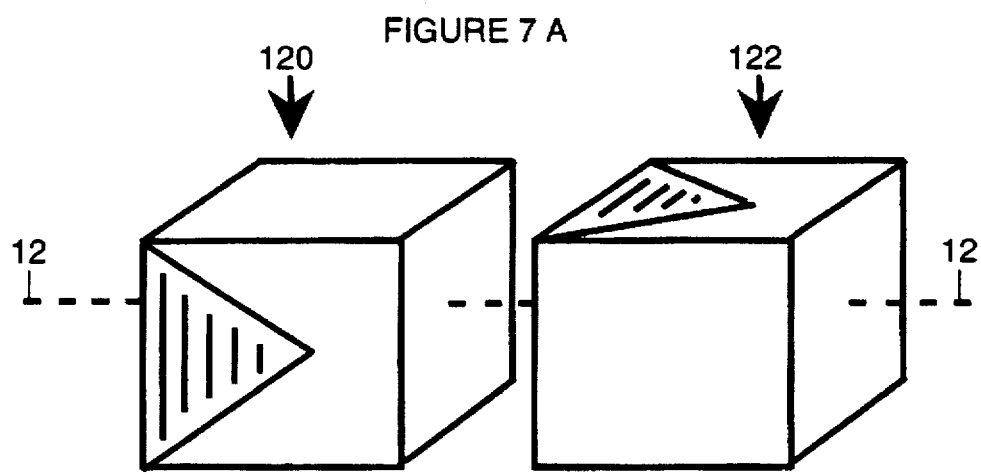
Figure 7:
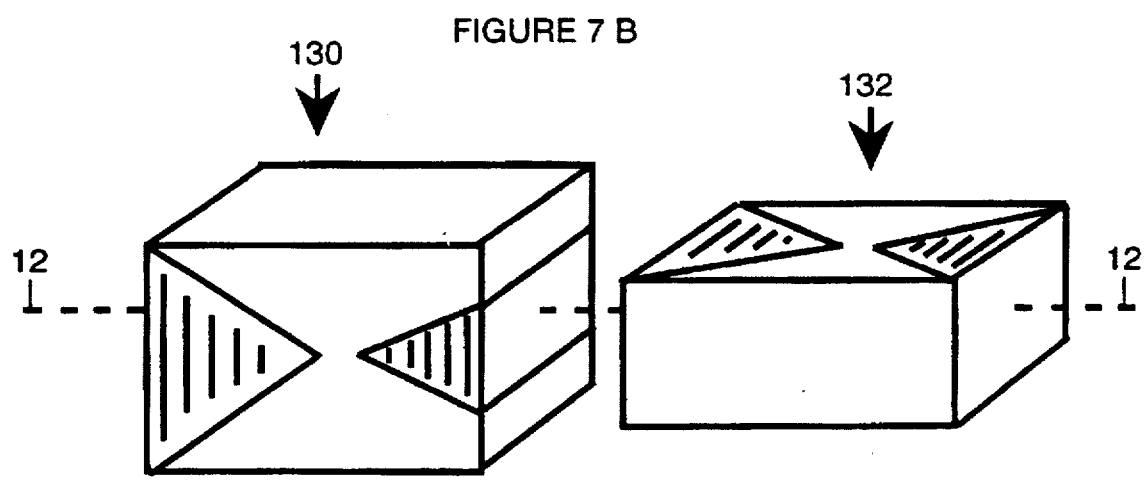
Figure 8:
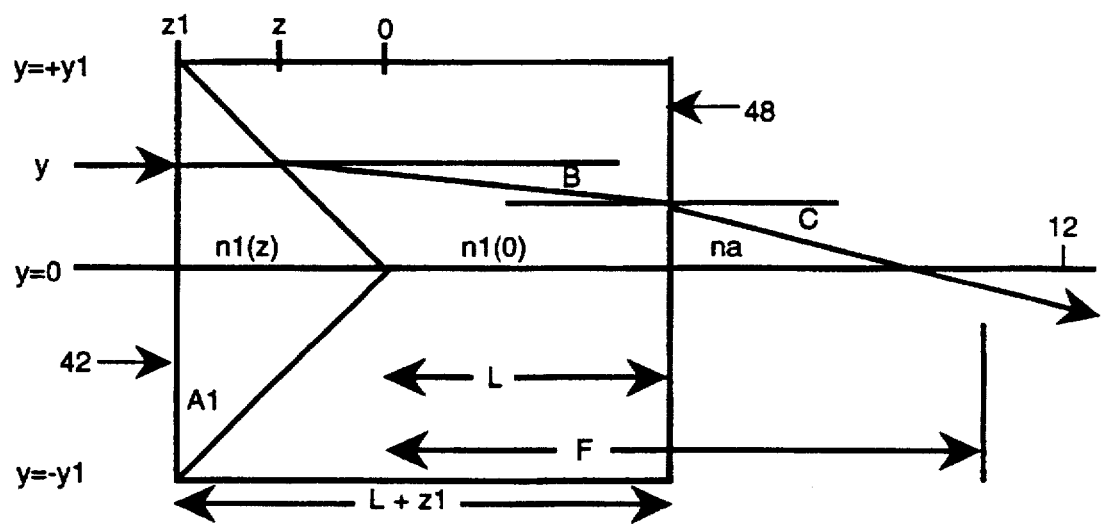
FIGS. 8A and 8B illustrate the parameters of the theoretical treatment of the lenses of FIGS. 2B and 5B respectively.
Figure 8:
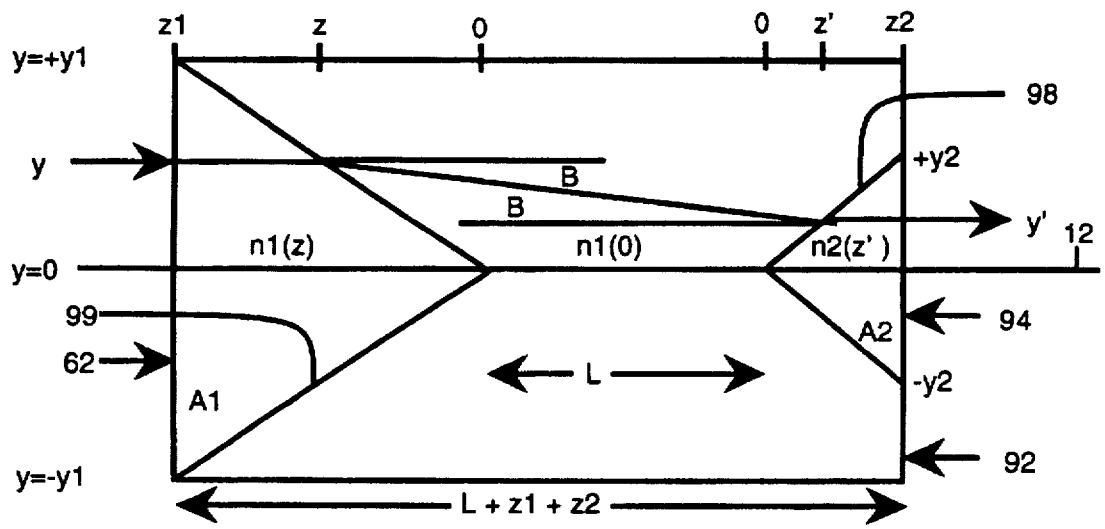

By placing two of the cylindrical function three-segment axial gradient lenses as described above, one behind the other but rotated 90 degrees about the optical axis, a beam can be independently manipulated in the two orthogonal transverse directions. Three lens systems utilizing this configuration are shown in FIG. 7. In FIG. 7A, two cylindrical lenses of the type depicted in FIG. 2B are arranged around optical axis 12. A segmented axial gradient lens 110 which will bend light in the vertical direction only is followed by a similar lens 112 which is rotated 90 degrees about optical axis 12 so that it bends light only in the horizontal direction. In FIG. 7B, two cylindrical lenses of the type depicted in FIG. 3B are arranged around optical axis 12. A segmented axial gradient wedge lens 120 which will bend light in the vertical direction only is followed by a similar lens 122 which is rotated 90 degrees so that it bends light only in the horizontal direction. In FIG. 7C, two three-segment lenses of the type depicted in FIG. 5B are arranged around optical axis 12. A three-segment axial gradient lens 130 which will affect the light rays only in the vertical direction is followed by a similar lens 132 which is rotated 90 degrees so that it affects the light rays only in the horizontal direction.

The optical power of the segmented axial gradient lens is due to the difference in index of refraction between the adjoining segments. The chemical composition of each segment can be chosen independently such as to ameliorate the chromatic aberrations in analogy to a standard chromatic doublet. The segmented axial gradient lens offers increased flexibility to the optical designer in its geometric parameters and the chemical composition of each segment. It also offers simple surfaces to the lens fabricator and simple index of refraction profiles to the maker of the lens blanks.

Theoretical Treatment

The following theoretical treatment for segmented axial gradient lenses provides the basics for selecting various lens parameters of a segmented axial gradient array lens of the invention. The basic theoretical formulae given below are exact, but their solution will be given only in the small angle approximation. These are meant to demonstrate the general overall parameters and index of refraction profile required for the segmented axial gradient lens. Exact calculations of the properties needed to achieve a required performance of such a lens can be performed by several commercially available optical design software packages. One such package is "Code V" available from Optical Research Associates of Pasadena, Calif. Other packages are "Synopsis" from BRO, Inc. of Tucson, Ariz. and "ZEMAX" from Focus Software, Inc. of Tucson, Ariz. The coordinates used in the discussion are defined and illustrated in FIGS. 8A and 8B for the segmented axial gradient lens embodiments illustrated in FIGS. 3B and 5B respectively.

For the two segment wedge lens illustrated in FIG. 8A, the equations that determine the optical ray path for a horizontal ray displaced a distance of y above the central optical axis 12 are $$n1(z) \sin (A1) = n1(0) \sin (A1+B) \quad (1)$$

$$n1(0) \sin (B) = na^* \sin (C) \quad (2)$$

$$y = (F-L) \tan (C) + (L+z) \tan (B) \quad (3)$$

$$z = y^* \tan (A1) = y^* z1/y1 \quad (4)$$

where:

n1(z) is the index of refraction of segment 42 as a function of the distance z from the apex 44 of the wedge segment 42 back along the optical axis 12 toward the front face of segment 42;

A1 is the base angle for the wedge;

n1(0) is the index of refraction of homogeneous segment 48 (which is defined here to be equal to the index at the apex of the wedge);

B is the angle a light ray is bent at the interface; na is the index of refraction of the medium within which the lens is positioned;

C is the angle at which a ray exiting the rear face of the lens is bent;

F is the focal length of the lens from the apex of the wedge;

L is the distance from the apex of the wedge to the rear surface;

z1 is the distance from the front face of the lens to the apex of the wedge; and y1 is one half the width of the base of the wedge.

A similar and symmetric treatment holds for rays incident below the central optical axis. Equations (1) and (2) are Snell's law of refraction applied at the wedge interface and at the rear surface. Equations (3) and (4) are geometric. For given dimensions of the lens and focal length, these equations determine n1(z), the index profile of wedge section 42 as a function of z. Note that there is no bending of the ray path in the gradient region because the propagation direction is parallel to the index gradient.

For small angles, these equations can be solved by expanding the trigonometric functions. The index profile is $$n1(z)/n1(0) = 1 + z*N/D(z), \quad (5)$$

where $$N = (y1/z1)^2 * (na/n1(0)); \quad (6)$$

and $$D(z) = F - L + (na/n1(0))(L+z). \quad (7)$$

For large focal length F, the function D(z) is essentially constant, and the index profile becomes linear in z, the distance along the axis of the gradient segment. Even for finite F, the index varies smoothly. The change in index dn needed to produce the focal length F is then $$dn = n1(z1) - n1(0) = y1^2 * na/[z*D(z1)], \quad (8)$$

and the focal length can be expressed as $$F = (L+z1)*(1-na/n1(0)) + (y1^2*na/dn - z1^2)/z1. \quad (9)$$

A segmented lens with z1=y1, na=1.0, n1(0)=1.5, dn=0.2, well within the state of the art, has a focal length of $$F = (L+z1)/3 + 4*z1. \quad (10)$$

For example, there are commercially available standard cylindrical lenses with parameters of F=54 mm and y1=12 mm. These values can be matched by a segmented axial gradient lens with the above index values and with L=6 mm and y1=z1=12 mm.

Figure 9:
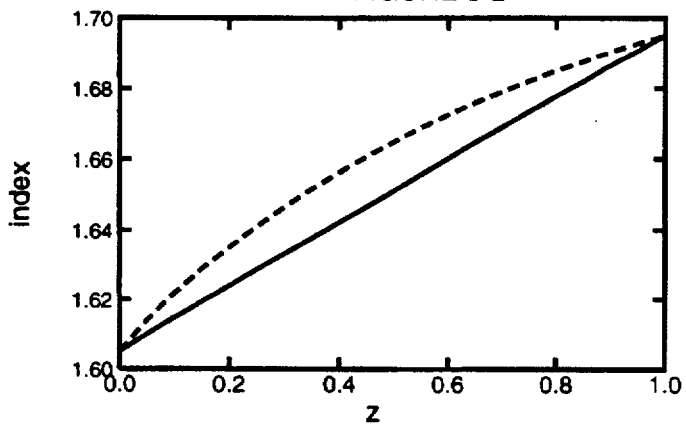
FIG. 9 is a graph showing the index of refraction profile required of the first segment of a lens of the type shown in FIG. 3B for two sample lens designs.

FIG. 9 shows the index profile required for a lens of the wedge type shown in FIG. 3B. Using the parameters as defined in FIG. 8A, the lens was assumed to have a full depth of 2 cm with L=1 cm and z1=1 cm. The range of the index of refraction was 1.695 to 1.605 and the homogeneous rear segment had an index of refraction of 1.605. The solid curve in FIG. 9 is the index profile calculated for a full height of 2 cm, that is, y1=1 cm, which yields a focal length F of 10.87 cm. The dashed curve in FIG. 9 is the index profile calculated for a reduced height of 0.67 cm, y1=0.335 cm, which yields a focal length F of 1 cm; thus F is equal to L, so that the image of an object at infinity will occur on the rear surface of the lens.

In FIG. 8B, a three segment design utilizing two axial gradient wedges 62, 94 is shown. This design will function as a beam expander/contractor or as a beam reshaper depending upon the index of refraction profiles that are chosen. The index of refraction profile in the first wedge 62 is denoted by n1(z) and in the second wedge 94 by n2(z'). The index of the central homogeneous segment 92 is equal to n1(0) which is equal to n2(0). L is the distance between the apex of segment 62 and the apex of segment 94. A2 is the base angle for segment 94. The equations that determine the path for an incident horizontal ray displaced a distance y above the optical axis 12 which emerges horizontally at a distance y' above the axis are $$n1(z) \sin(A1) = n1(0) \sin(A1+B) \quad (11)$$

$$n1(0) \sin(A2-B) = n2(z') \sin(A2) \quad (12)$$

$$\tan(B) = (y-y')/[L+z+z'] \quad (13)$$

$$z = y*\tan(A1) = y*z1/y1 \quad (14)$$

$$z' = y'*\tan(A2) = y'*z2/y2. \quad (15)$$

A symmetric treatment holds for rays incident below the central optical axis 12. For given dimensions of the lens, focal length and functionality, these equations determine n1(z) and n2(z'), the index profiles of the two wedges.

For small angles, these equations can be solved by expanding the trigonometric functions. The index profiles are $$n1(z)/n1(0) = 1 + (y1/z1)*B(z) \quad (16)$$

$$n2(z')/n1(0) = 1 - (y1/z1)*B(z'), \quad (17)$$

where $$B = (y-y')/[L+z+z'], \quad (18)$$

and the ray deflection angle B can be expressed as a function of z or of z' to fully determine n1(z) and n2(z').

For the beam expander/contractor, the beam intensity distribution must be scaled in the y-direction. This implies that y'=y*y2/y1 which in turn requires z'=z*z2/z1, so that $$B(z) = (z/z1)*(y1-y2)/[L+z(1+z2/z1)] \quad (19)$$

$$B(z') = (z'/z2)*(y1-y2)/[L+z'(1+z1/z2)]. \quad (20)$$

For L large compared to (z1+z2), the denominator in B is essentially constant, and both axial index profiles become linear in the distance along the optical axis of the gradient segment.

For a beam reshaper, the distribution of intensity in the incident beam must be rearranged to the desired final intensity distribution. Thus, the exit coordinate y' must be a given function of the entrance coordinate y, y'=y'(y). By using this y' value, and the implied relation between z' and z in the above equations for the deflection angle B(z), the index distributions for the two axial gradient segments for the reshaper are completely determined.

For example, if the incident intensity distribution is i(y) (assumed symmetric) and the desired output intensity distribution is flat, the requirement of energy conservation forces the relation $$y'=y2*I(y)/I(y1),$$

where I(y) is the integral of i(y) from 0 to the point y. This relation between y' and y then determines the relation between z' and z, and eventually, both of the index profiles.

If a segmented axial gradient lens is used in an optical system which contains other optical elements, the designer can choose the index of refraction profile to meet the performance requirements of the total system. In short, the index gradient can correct for the aberrations induced by several lens elements. For example, the designer can replace an ordinary element with a segmented axial gradient lens and choose its index profile so that the aberrations are minimized in one transverse direction. A second segmented axial gradient lens mounted at right angles to the first can minimize the aberrations in the orthogonal transverse direction.

The principles and designs for individual segmented axial gradient lenses discussed above can be applied to the array lenses of the invention. Thus, a cylindrical lens functionality of the lenses of FIGS. 2B, 2D, 3B, 3D, and 5A–5C can provide the functionality of an array of parallel cylindrical lenses or for a narrow beam input an optical multiplexer. The point foci lens functionality of the lenses of FIGS. 4B, 4D, 6 and 7A–C can provide the functionality of a two dimensional array of point foci such as that of a video monitor.

Array Lenses

Figure 10:
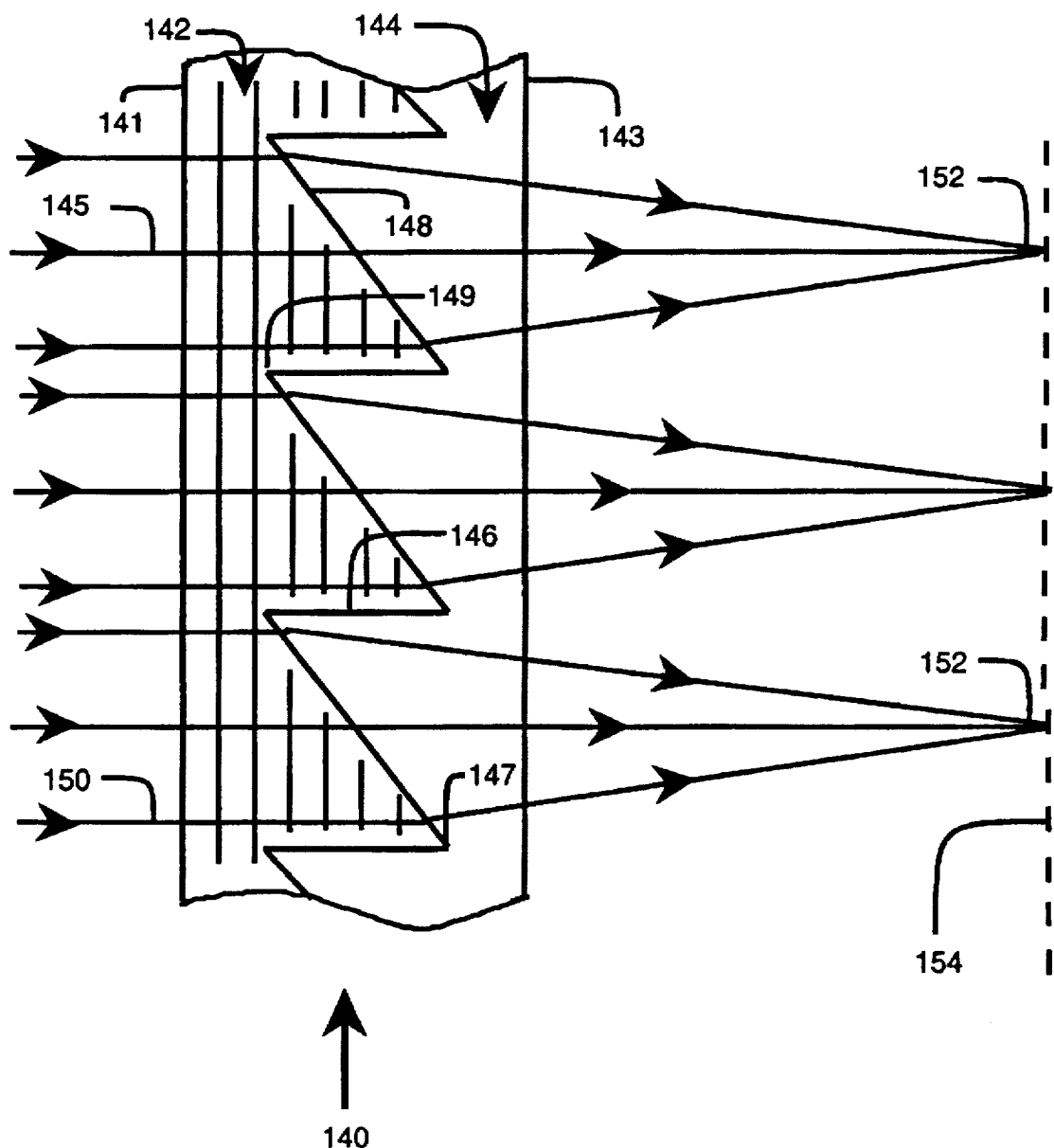
FIG. 10 is a cross-sectional view of a two sheet axial gradient array lens of the invention with the grooves of the interface between an axial gradient sheet and a homogeneous sheet having one wall parallel to the optical axes.

The wedge, plane and cononical nterfaces of the individual segmented axial gradient lenses are implemented in the array lenses of the invention with sheets of optical material having parallel grooves or an array of cones at the interfaces between sheets. FIG. 10 shows a side sectional view of an array lens 140 with a first planar sheet 142 having an axial gradient index of refraction profile and a second planar sheet 144 having a homogeneous index of refraction. The first sheet includes first and second sides with the first side forming a front surface 141 of the array lens 140. The second sheet includes first and second sides with the second side forming the rear surface 143 of the array lens. The second side of the first sheet 142 and the first side of the second sheet 144 are provided with corresponding parallel grooves and ridges which mate with each other. Each of the grooves has two planar walls. The grooves of first sheet 142 each includes a wall 146 which is parallel to the optical axis and a wall 148 which forms a finite non-normal angle with the optical axis. The optical axis is normal to front surface 141. Line 145 is one optical axis of lens 140. It should be noted that for the array lens structures of the invention, each lens has a plurality of optical axes. In the case of lenses having the functionality of a plurality of parallel cylindrical lenses, lines normal to the front surface and lying in planes of light rays not bent by the lens can be considered optical axes. In the case of an array lens which produces an array of foci in an image plane, lines normal to the front surface and containing the point foci will be optical axes. Those of ordinary skill in the art will understand the positioning of the optical axes for various other configurations of the array lenses of the invention. The walls of adjacent grooves in sheet 142 meet to form ridges 147 and the walls of adjacent grooves in sheet 144 meet to form ridges 149. A beam of parallel rays 150 is shown entering the front surface 141 of the array lens 140. The rays are bent at the interface between the sheets 142 and 144 and at the rear surface 143 of the array lens 140 (except for rays along the optical axes where the indices of refraction of the two sheets are exactly equal) in the manner as described above with reference to FIGS. 2B and 8A. A series of parallel line foci 152 are formed at an image plane 154 of the lens 140. Thus, the array lens 140 provides the functionality of a sequence of parallel cylindrical lenses. The lens array will also function if planar sheet 142 has a homogeneous index of refraction and sheet 144 contains a suitable index of refraction profile.

Figure 11:
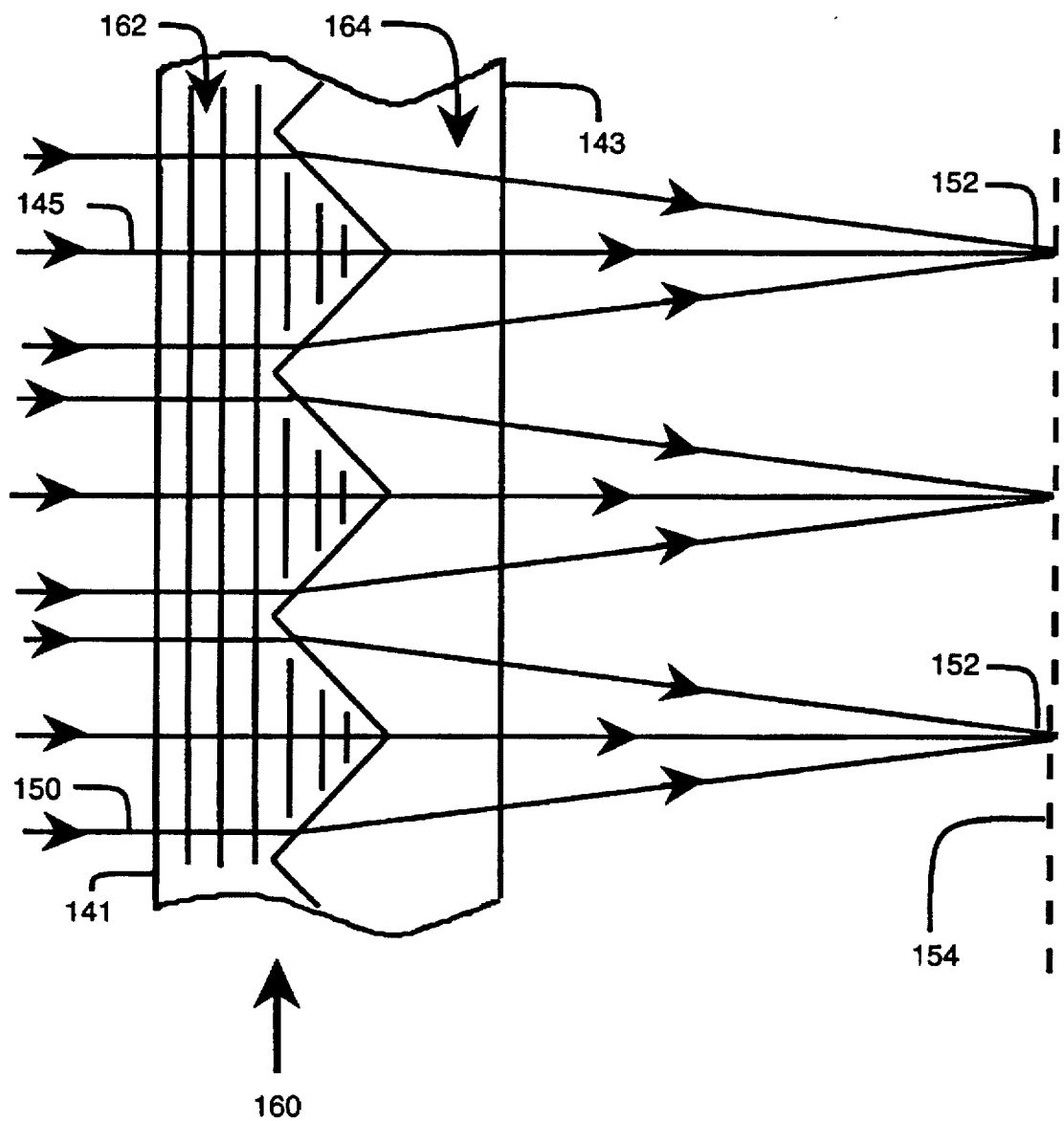
FIG. 11 is a cross-sectional view of a two sheet axial gradient array lens of the invention with the grooves of the interface between an axial gradient sheet and a homogeneous sheet having both walls at finite non-normal angles to the optical axes.

Referring now to FIG. 11, an array lens 160 is shown in cross section having a first axial gradient sheet 162 and a second homogeneous sheet 164. The array lens 160 functions in a manner similar to the array lens 140 of FIG. 10 except that both walls of each groove in the two sheets form finite non-normal angles with with ray parallel to the optical axes. These angles may be selected along with the gradient profile to provide the desired focal length. As with lens 140 of FIG. 10, array lens 160 provides a series of parallel line foci formed at an image plane of the lens. The lens array will also function if planar sheet 162 has a homogeneous index of refraction and sheet 164 contains a suitable index of refraction profile.

Figure 12:
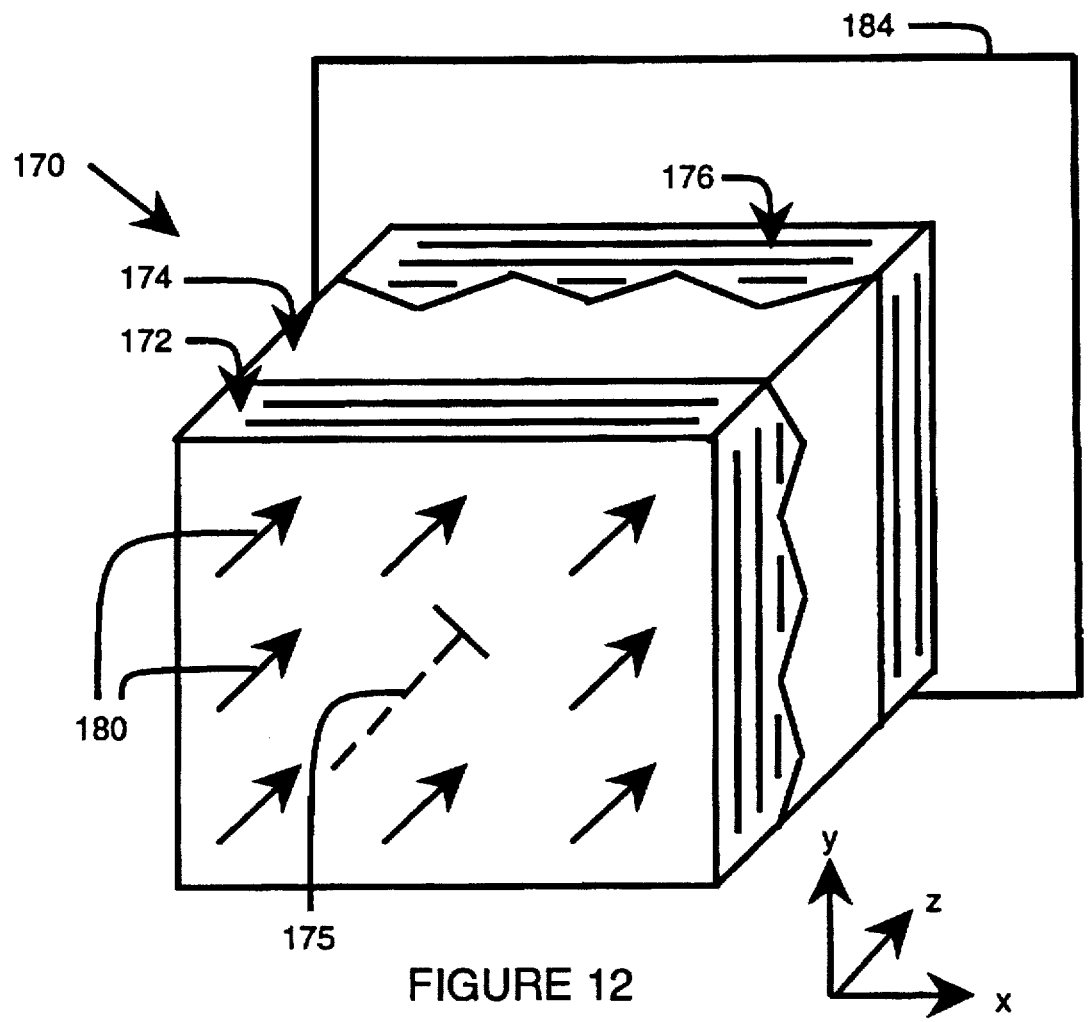
FIG. 12 is a perspective view of a three sheet axial gradient array lens of the invention having first and last axial gradient sheets and an intermediate homogeneous sheet with the grooves of the interfaces rotated 90 degrees relative to each other.
Figure 13:
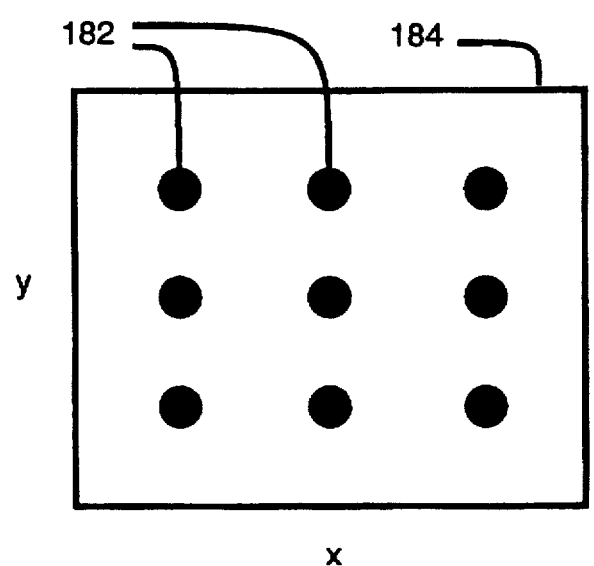
FIG. 13 shows the pixel array output at the image plane of the array lens of FIG. 12.
Figure 14:
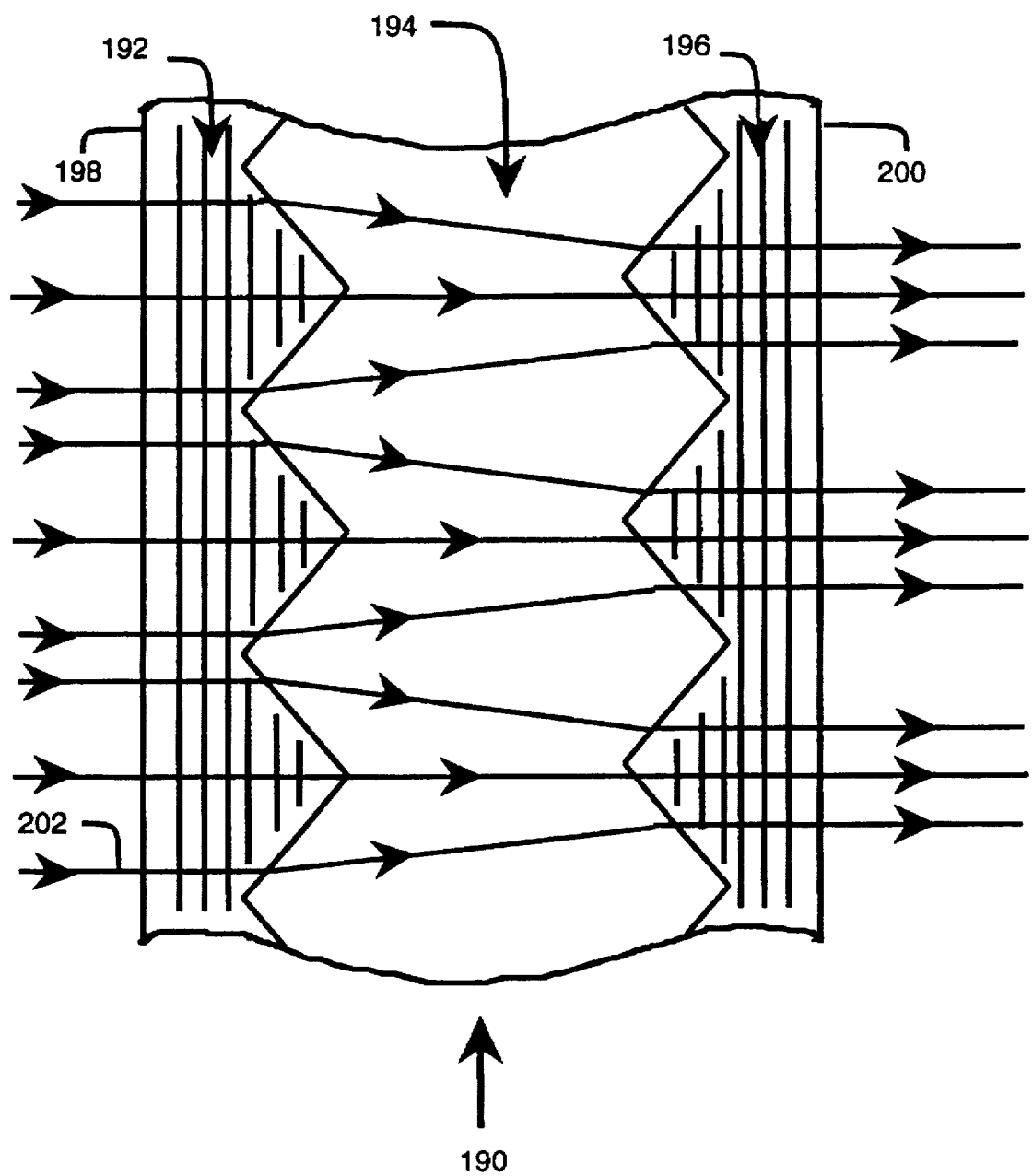
FIGS. 14A and 14B are two views of a three sheet axial gradient array lens of the invention having first and last axial gradient sheets and an intermediate homogeneous sheet with the grooves of the interfaces parallel to each other.
Figure 14:
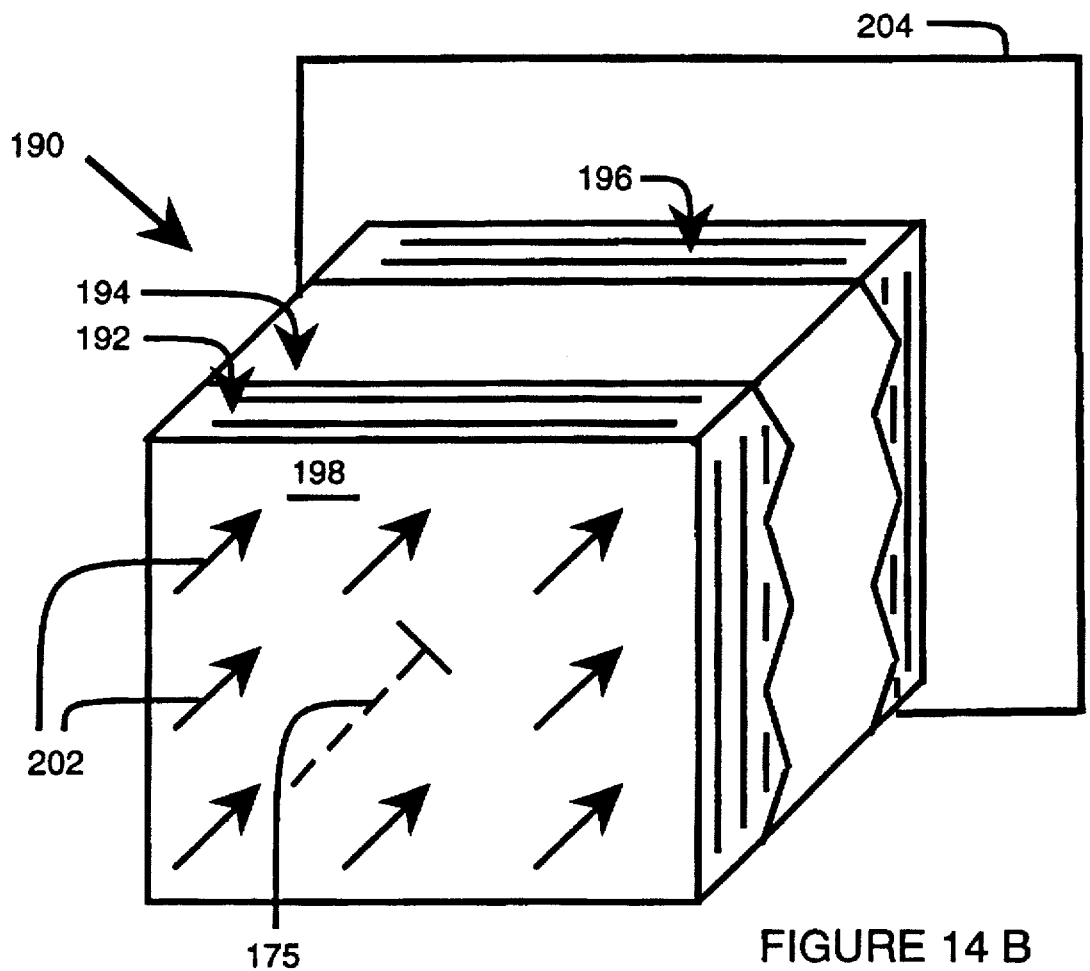

FIG. 12 shows a perspective view of an array lens 170. Lens 170 includes a first planar sheet 172, an intermediate planar sheet 174 and a last planar sheet 176. Sheets 172 and 176 each has an axial gradient index of refraction profile. The parallel grooves and ridges which form the interface between sheets 172 and 174 are rotated 90 degrees around a central axis 175 relative to the grooves and ridges which form the interface between sheets 174 and 176. A beam of parallel rays 180 is shown entering the front surface of the array lens 170. The rays are bent at the interfaces between the sheets 172 and 174, the sheets 174 and 176, and at the rear surface of the array lens 170 in the manner as described above with reference to FIG. 6. A two dimensional array of foci 182 are formed at an image plane 184 of the lens 170 as seen in FIG. 13.

Figure 15:
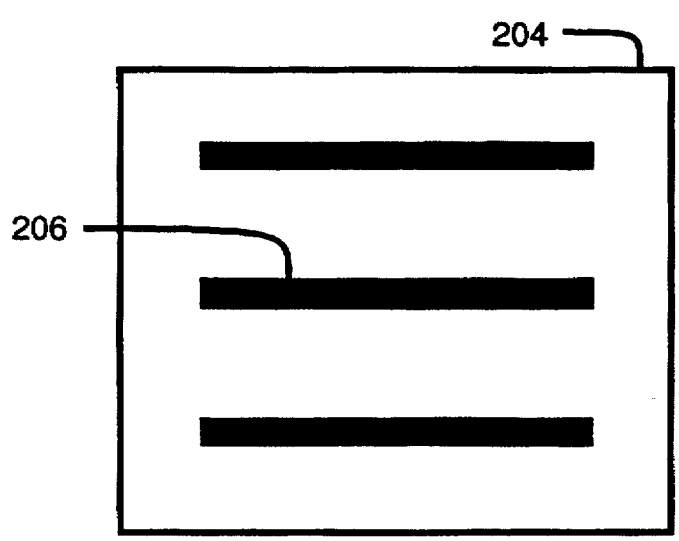
FIG. 15 shows the parallel finite sized beam stripes which are the output of the array lens of FIG. 14.

Referring now to FIGS. 14A, 14B, and 15, an array lens 190 is provided which produces as an output a series of parallel, finite-sized beam stripes. Array lens 190 is shown in cross-section in FIG. 14A with a first planar sheet 192 having an axial gradient index of refraction profile, an intermediate planar sheet 194 having a homogeneous index of refraction, and a last planar sheet 196 having an axial gradient index of refraction profile. This same array is shown in perspective view in FIG. 14B. First sheet 192 includes first and second sides with the first side forming a front surface 198 of the array lens 190. Last sheet 196 includes first and second sides with the second side forming the rear surface 200 of the array lens. The intermediate sheet 194 includes first and second sides which interface with the second side of the first sheet and the first side of the last sheet, respectively. The interfaces between the adjacent sheets are provided with mating grooves and ridges. A beam of parallel rays 202 is shown entering the front surface 198 of the array lens 190. The rays are bent at the interfaces between the respective sheets 192, 194 and 196. In this embodiment, the rays are not bent at the rear surface 200 since they exit the lens normal to the surface. Thus, the rays are bent at the interfaces in the manner as described above with reference to FIGS. 5 A–5C and 8B. In FIG. 14B, an output viewing surface 204 is depicted beyond the lens 190. As shown in FIG. 15, a series of parallel beam stripes 206 are provided as the output of array lens 190 upon the surface 204.

Figure 16:
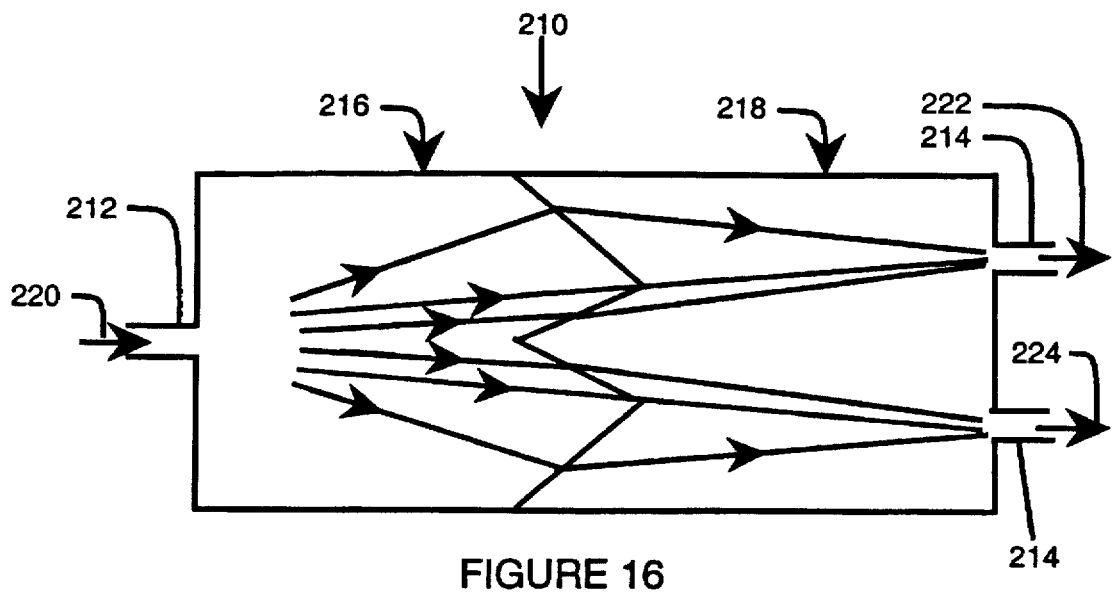
FIG. 16 is a cross-sectional view of an optical multiplexer using the axial gradient array lens structure of the invention.
Figure 17:
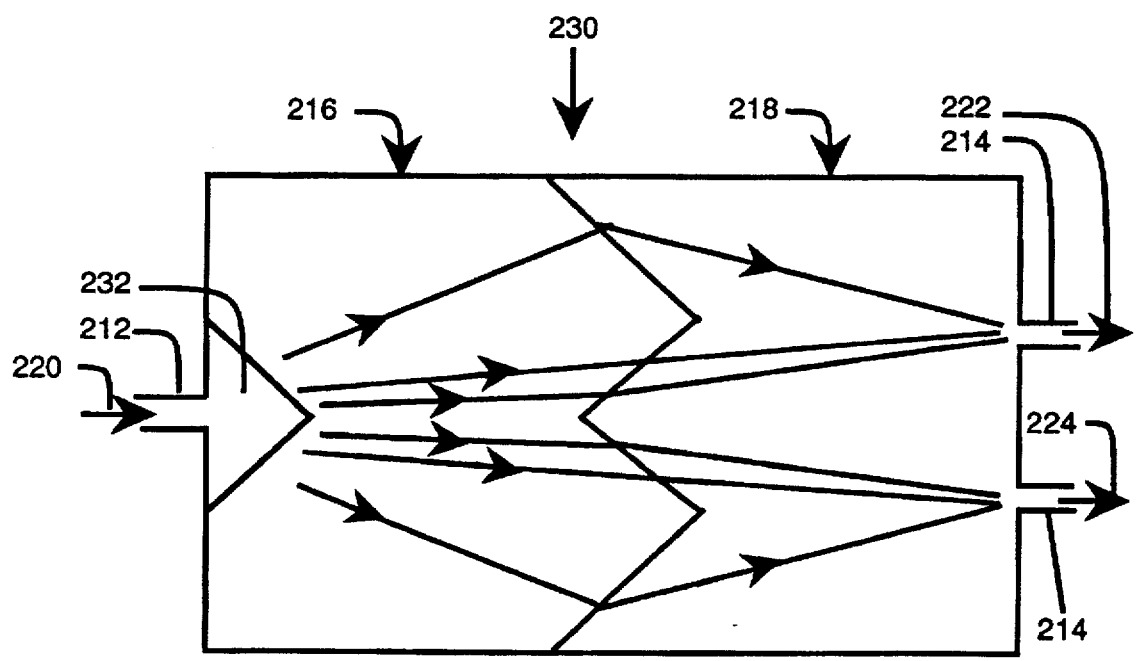
FIG. 17 is a cross-sectional view of an alternative optical multiplexer using the axial gradient array lens structure of the invention.
Figure 18:
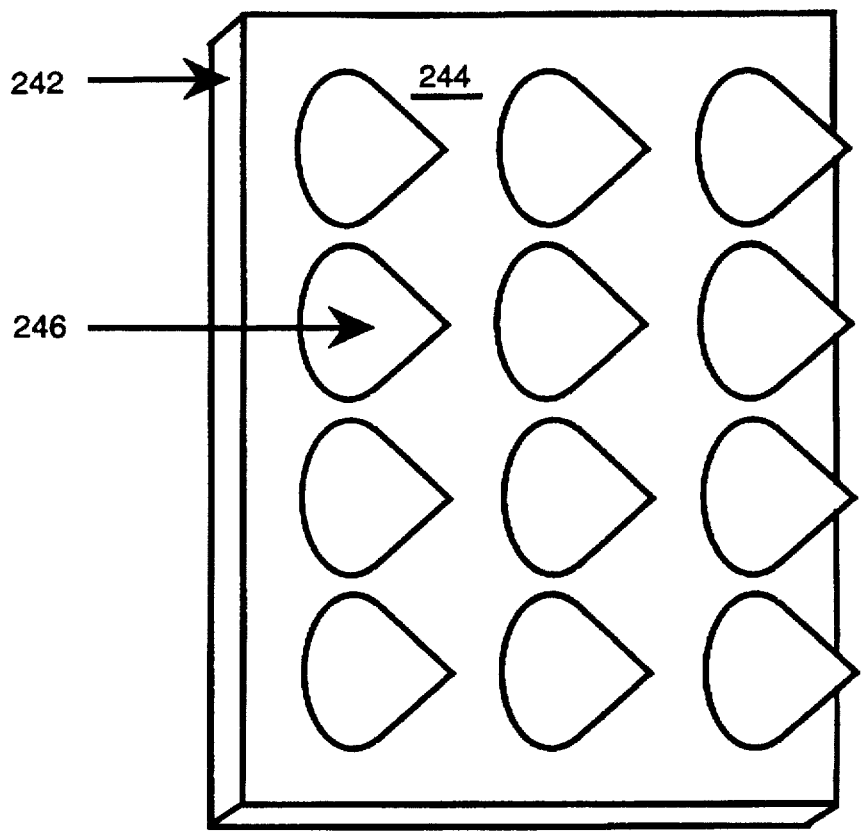
FIG. 18A is a view of a sheet of optical material with an array of cones on one surface.
FIG. 18B is a cross-sectional view of an array lens of the invention with cones at the interface between the sheets.
Figure 18:
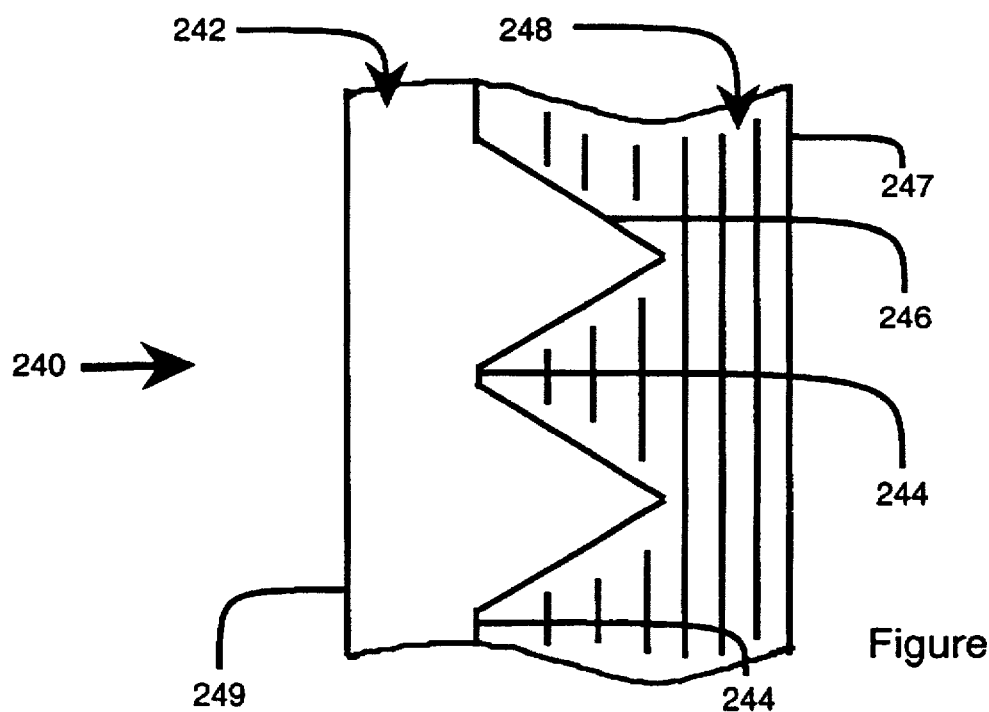

FIGS. 16 and 17 provide examples of one use of the lenses of the invention. FIG. 16 shows an optical multiplexer 210 using the lens structure described with reference to FIG. 11. An input port 212 and two output ports 214 such as can be achieved with optical fibers or light pipes are provided. The optical fibers or light pipes may be joined to the lens structure in a manner known to those skilled in the art. The multiplexer 210 includes a gradient index of refraction segment 216 and a homogeneous segment 218. The interface side of segment 216 includes one full groove and two half grooves and the interface side of segment 218 includes two full grooves. An input beam 220 at port 212 will generally diverge as shown and be focused at the interface to two output beams 222 and 224.

In the multiplexer 230 shown in FIG. 17, a homogeneous, low index of refraction wedge section 232 is provided to interface with input port 212. This will provide more beam divergence at the input location.

FIG. 18A shows a perspective view of an array lens sheet 242 that utilizes cones as the interface surfaces. As seen in FIG. 18B which is a side view of an assembled lens 240 the lens includes first planar sheet 242 and last planar sheet 248. Sheet 248 has an axial gradient index of refraction profile and a series of conical indentations on its from surface and a planar rear surface 247. Sheet 242 has a planar front face 249 and a series of cones 246 on its rear face that fit into the indentations in sheet 248. The planar surface 244 is in contact with the planar surface of sheet 248. A two dimensional array of foci are formed at an image plane to the rear of the array lens 240.

The number of intermediate layers in the array lenses of the invention is not limited to one. Nor is the intermediate layer limited to have a homogeneous index of refraction. Multiple intermediate sheets may be utilized with none, some or all having an axial gradient index of refraction profile. The particular configuration may be selected to provide the desired magnification and focal length for the lens.

It should be understood that various alternatives to the embodiments of the invention described herein may be employed in practicing the invention. It is thus intended that the following claims define the scope of the invention and that structures and methods within the scope of these claims and their equivalents be covered thereby.

What is claimed is:

1. A segmented array lens having a front surface, a rear surface and a plurality of parallel optical axes, said lens comprising:
    a first planar sheet having first and second sides, said second side of said first sheet having a series of parallel grooves, each of said grooves including a pair of planar walls, adjacent ones of said grooves intersecting at one or more ridges parallel to said grooves;
    a second planar sheet having first and second sides, said first side of said second sheet including a series of parallel grooves, each of said grooves including a pair of planar walls, adjacent ones of said grooves intersecting at one or more ridges parallel to said grooves;
    said ridges of said second side of said first sheet mating with said grooves of said first side of said second sheet and said ridges of said first side of said second sheet mating with said grooves of said second side of said first sheet to form a continuous interface from said first sheet to said second sheet;
    at least one wall of said grooves forming a finite, non-normal angle with one of said optical axes; and
    at least one of said sheets has an axial gradient index of refraction profile.

2. The lens of claim 1 wherein said front surface and said rear surface are each planar.

3. The lens of claim 1 wherein one of said sheets has an axial gradient index of refraction profile achieves a desired optical function and the other of said sheets has a homogeneous index of refraction.

4. The lens of claim 3 wherein said interface between each corresponding pair of grooves and ridges of said first and second sheets each comprises a plane inclined at a predetermined angle from one of said optical axes and wherein said index of refraction profile is produces the functionality of an array of parallel cylindrical lenses.

5. The lens of claim 3 wherein said interface between each corresponding pair of grooves and ridges of said first and second sheets each comprises a wedge with its sides inclined at a predetermined angle from said optical axes and said index of refraction profile is produces the functionality of an array of parallel cylindrical lenses.

6. The lens of claim 1 wherein each of said sheets has an axial gradient index of refraction profile.

7. A segmented array lens having a front surface, a rear surface and a plurality of parallel optical axes, said lens comprising:
    a plurality of planar sheets each having a first and a second side;
    said first side of a first one of said sheets forming said front surface and said second side of said first sheet having a series of parallel grooves, each of said grooves including a pair of planar walls, adjacent ones of said grooves intersecting at ridges parallel to said grooves;
    said second side of a last one of said sheets forming said rear surface and said first side of said last sheet having a series of parallel grooves, each of said grooves including a pair of planar walls, adjacent ones of said grooves intersecting at ridges parallel to said grooves;
    one or more intermediate one of said sheets positioned between said first and last sheets, said first and second sides of each of said intermediate sheets each having a series of parallel grooves, each of said grooves including a pair of planar walls, adjacent ones of said grooves intersecting at ridges parallel to said grooves;
    said ridges and grooves of adjacent ones of said sheets mating to form continuous interfaces between adjacent sheets;
    at least one wall of said grooves forming a finite, non-normal angle with one of said optical axes; and
    at least one of said sheets having an axial gradient index of refraction profile.

8. The lens of claim 7 wherein said front surface and said rear surface are each planar.

9. The lens of claim 7 wherein said first and last sheets each has an axial index of refraction profile achieves a desired optical function, said lens including one intermediate sheet having a homogeneous index of refraction.

10. The lens of claim 9 wherein said grooves of said interface between said first sheet and said intermediate sheet are parallel to said grooves of said interface between said intermediate sheet and said last sheet.

11. The lens of claim 9 wherein said axial index of refraction profile in said first sheet and said axial index of refraction profile in said last sheet acts on an incident beam so as to both change the beam's transverse dimension and redistribute the intensity distribution of the beam.

12. The lens of claim 9 wherein said grooves of said interface between said first sheet and said intermediate sheet are oriented 90 degrees about a central axis from said grooves of said interface between said intermediate sheet and said last sheet.

13. The lens of claim 7 wherein said interfaces between corresponding grooves and ridges of said adjacent sheets each comprises a wedge with its sides inclined at a predetermined angle from said optical axis.

14. The lens of claim 7 including at least two intermediate sheets and wherein at least one of said intermediate sheets has an axial index of refraction profile and at least one of said intermediate sheets has a homogeneous index of refraction.

15. The lens of claim 7 wherein said first and last sheets each has a homogeneous index of refraction, said lens including one intermediate sheet having an axial index of refraction profile which achieves a desired optical function.

16. A segmented array lens having a front surface, a rear surface and a plurality of parallel optical axes, said lens comprising:

a first planar sheet having first and second sides and an axial index of refraction profile, said second side of said first sheet including an array of cones;

a second planar sheet having first and second sides, said first side of said second sheet including an army of conical indentations corresponding to said cones of said first sheet; and said cones of said second side of said first sheet mating with said conical indentations of said first side of said second sheet to form a continuous interface from said first sheet to said second sheet.

17. The lens of claim 16 wherein said second sheet has an axial index of refraction profile and said cones and conical indentations have sides inclined at a predetermined angle from said optical axis and said index of refraction profiles produce the functionality of an array of spherical lenses.

18. An optical multiplexer comprising a segmented array lens having a front surface, a rear surface and a plurality of parallel optical axes, said lens comprising:

a first planar sheet having first and second sides and an axial gradient index of refraction profile, said second side of said first sheet having a series of parallel grooves, each of said grooves including a pair of planar walls, adjacent ones of said grooves intersecting at one or more ridges parallel to said grooves;

a second planar sheet having first and second sides, said first side of said second sheet including a series of parallel grooves, each of said grooves including a pair of planar walls, adjacent ones of said grooves intersecting at one or more ridges parallel to said grooves;

said ridges of said second side of said first sheet mating with said grooves of said first side of said second sheet and said ridges of said first side of said second sheet mating with said grooves of said second side of said first sheet to form a continuous interface from said first sheet to said second sheet;

at least one wall of said grooves forming a finite, non-normal angle with one of said optical axes; and said multiplexer further including an input port and a plurality of output ports.

19. The optical multiplexer of claim 18 wherein said first sheet further includes a beam divergence section at said input port.

20. The optical multiplexer of claim 19 wherein said beam divergence section comprises a wedge.

21. A segmented array lens having a front surface, a rear surface and a plurality of parallel optical axes, said lens comprising:

a plurality of planar adjacent sheets each having a first and a second side;

said first side of a first one of said sheets forming said front surface and said second side of a last one of said sheets forming said rear surface;

adjacent ones of said sheets having their respective second and first sides forming continuous interfaces with each other, said interfaces comprising either a series of mating parallel grooves and ridges or an array of mating cones and conical indentations; and at least one of said sheets having an axial gradient index of refraction profile.

* * * * *